(12) United States Patent
Umezuki

(10) Patent No.: US 8,738,933 B2
(45) Date of Patent: May 27, 2014

(54) ARCHIVE SYSTEM, MANAGEMENT APPARATUS, AND CONTROL METHOD

(75) Inventor: Takeshi Umezuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 314 days.

(21) Appl. No.: 12/662,693

(22) Filed: Apr. 28, 2010

(65) Prior Publication Data

US 2010/0217983 A1  Aug. 26, 2010

Related U.S. Application Data

(63) Continuation of application No. PCT/JP2007/072028, filed on Nov. 13, 2007.

(51) Int. Cl.
*H04L 9/32* (2006.01)

(52) U.S. Cl.
USPC .......................................... 713/193

(58) Field of Classification Search
USPC ................................. 713/168, 193
See application file for complete search history.

(56) References Cited

U.S. PATENT DOCUMENTS

| | | | |
|---|---|---|---|
| 7,991,155 B2 | 8/2011 | Fujioka et al. | |
| 2004/0003239 A1* | 1/2004 | Ohmori et al. | 713/158 |
| 2004/0010509 A1* | 1/2004 | Higashiura et al. | 707/102 |
| 2006/0075245 A1 | 4/2006 | Meier | |
| 2007/0078866 A1* | 4/2007 | Takashima | 707/100 |
| 2007/0271386 A1* | 11/2007 | Kurihara et al. | 709/228 |
| 2008/0181414 A1* | 7/2008 | Deaver et al. | 380/279 |
| 2008/0310628 A1* | 12/2008 | Fujioka et al. | 380/201 |
| 2010/0217987 A1* | 8/2010 | Shevade | 713/175 |

FOREIGN PATENT DOCUMENTS

| | | | |
|---|---|---|---|
| JP | 2004-46592 | 2/2004 | |
| JP | 2004-185500 | 7/2004 | |
| JP | 2005-71245 | 3/2005 | |
| JP | 2006-211051 | 8/2006 | |
| JP | 2006-285697 | 10/2006 | |
| WO | WO/2006/080510 | * 3/2006 | G06F 21/24 |
| WO | 2006/080510 | 8/2006 | |

OTHER PUBLICATIONS

International Search Report for PCT/JP2007/072028, mailed on Dec. 25, 2007.
Japanese Office Action issued Jul. 17, 2012 in corresponding Japanese Patent Application No. 2009-540994.

* cited by examiner

*Primary Examiner* — Matthew Smithers
(74) *Attorney, Agent, or Firm* — Staas & Halsey LLP

(57) ABSTRACT

A user terminal reads out an encrypted content from a removable memory medium, assigns data forming the read encrypted content to the same hash function, and computes a first hash value. The management apparatus acquires the computed first hash value and management information from the user terminal, reads out, from a management information memory that stores a second hash value previously computed by assigning data forming the encrypted content retaining its authenticity to the hash function in association with the management information, the corresponding second hash value by using the acquired management information as a retrieval key, authenticates whether the acquired first hash value and the second hash value are identical, and permits a decryption process when the authentication result is an authentication success.

16 Claims, 11 Drawing Sheets

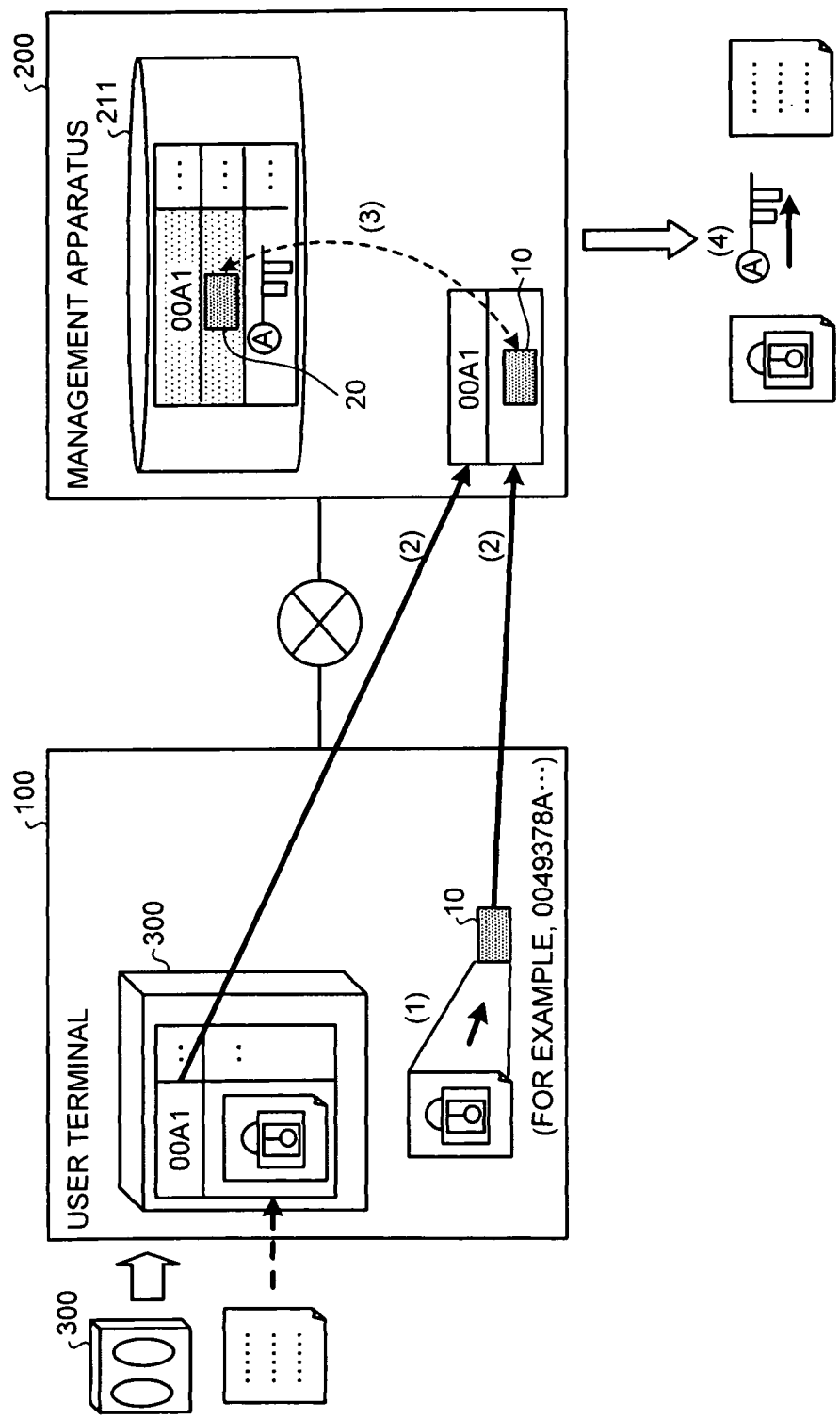

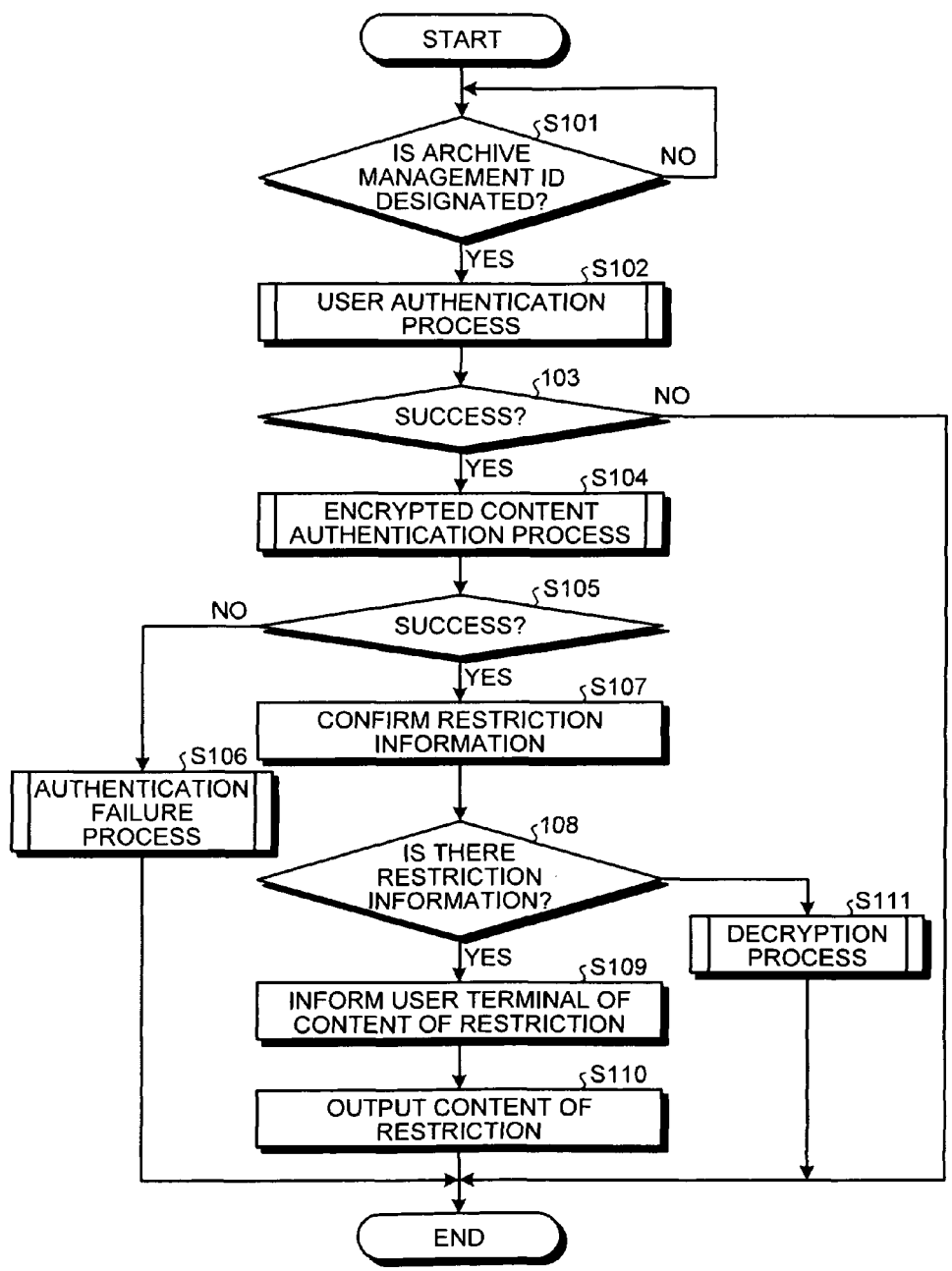

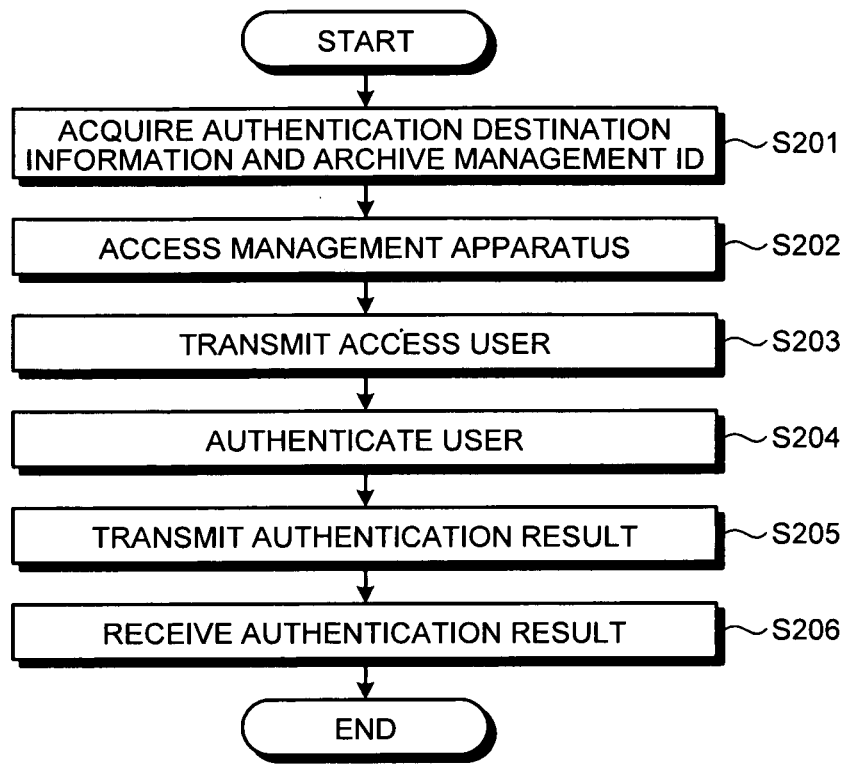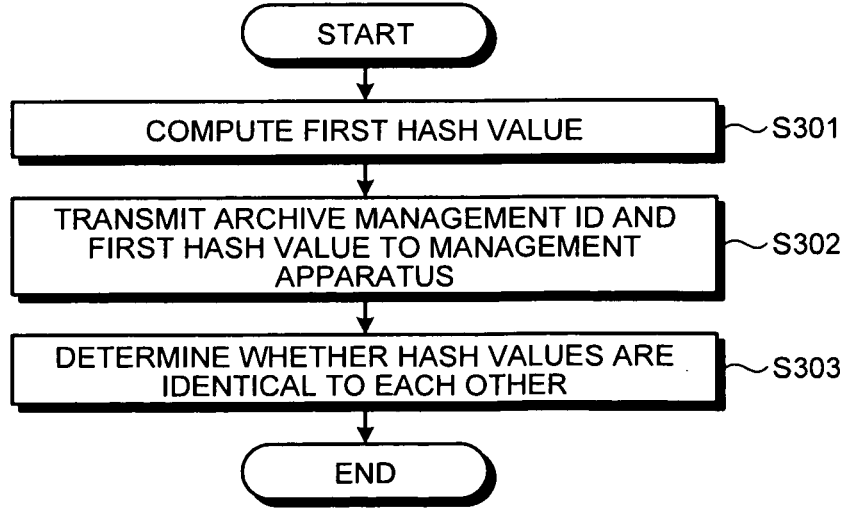

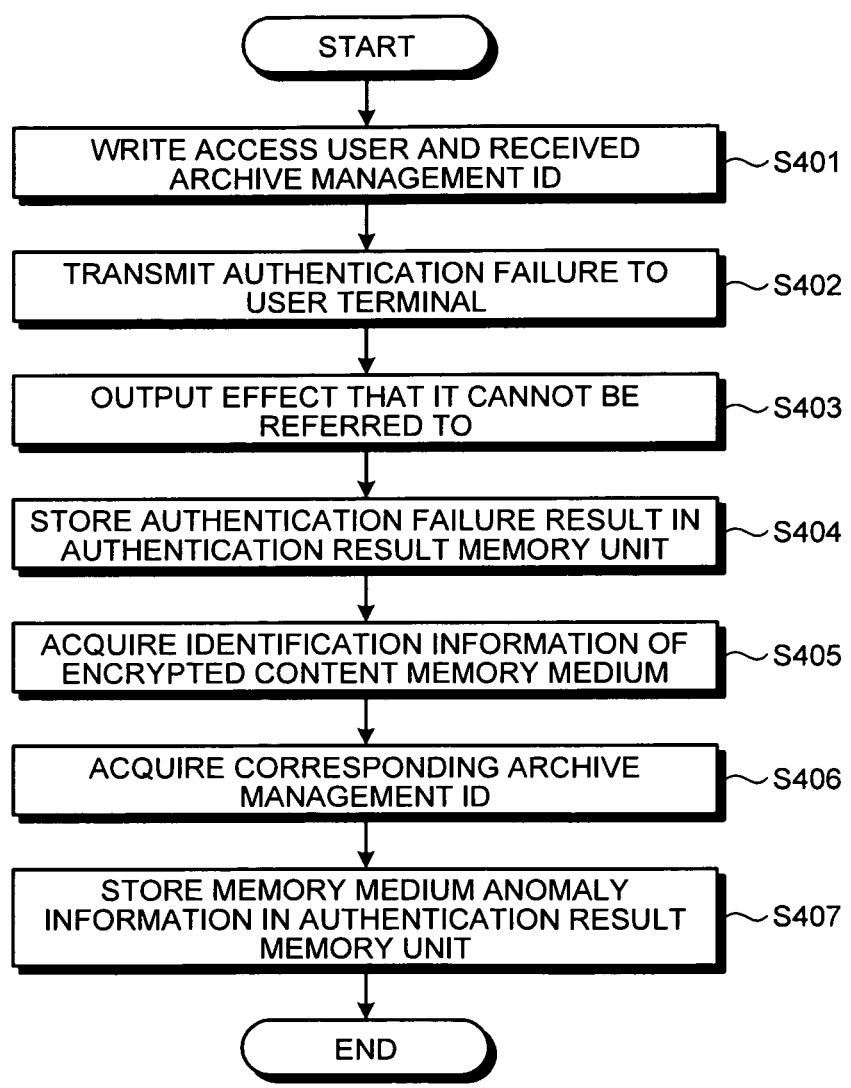

FIG.8

| MEMORY MEDIUM IDENTIFICATION INFORMATION | A0112 |
|---|---|
| AUTHENTICATION DESTINATION INFORMATION | 211.9··· |

| ARCHIVE MANAGEMENT ID | ENCRYPTED CONTENT |
|---|---|
| 0011 | A |
| 0012 | B |
| 0013 | C |
| ⋮ | ⋮ |

FIG.9

| ARCHIVE MANAGEMENT ID | SECOND HASH VALUE | DECRYPTION KEY | ACCESS USER | MEMORY MEDIUM IDENTIFICATION INFORMATION |
|---|---|---|---|---|
| 0011 | A246K8⋯ | KEY A | ICHIRO YAMADA | A0112 |
| 0012 | B3453⋯ | KEY B | ICHIRO YAMADA, JIRO YAMADA | A2222 |
| 0013 | C4444⋯ | KEY C | SABURO YAMADA | A2222 |
| 0014 | D5432⋯ | KEY D | SHIRO YAMADA | A2222 |
| 0015 | E3456⋯ | KEY E | SAKURAKO YAMADA | A3333 |
| ⋯ | | | ⋯ | |

FIG.10

| ARCHIVE MANAGEMENT ID | STORAGE MEDIUM IDENTIFICATION INFORMATION | DISCARD INFORMATION |
|---|---|---|
| 0011 | B111 | ALREADY-DISCARDED |
| ⋮ | ⋮ | ⋮ |

FIG.11

| ARCHIVE MANAGEMENT ID | AUTHENTICATION FAILURE RESULT | MEMORY MEDIUM ANOMALY INFORMATION |
|---|---|---|
| 0012 | PRESENCE | |
| 0013 | | PRESENCE |
| 0014 | | PRESENCE |
| ⋮ | ⋮ | ⋮ |

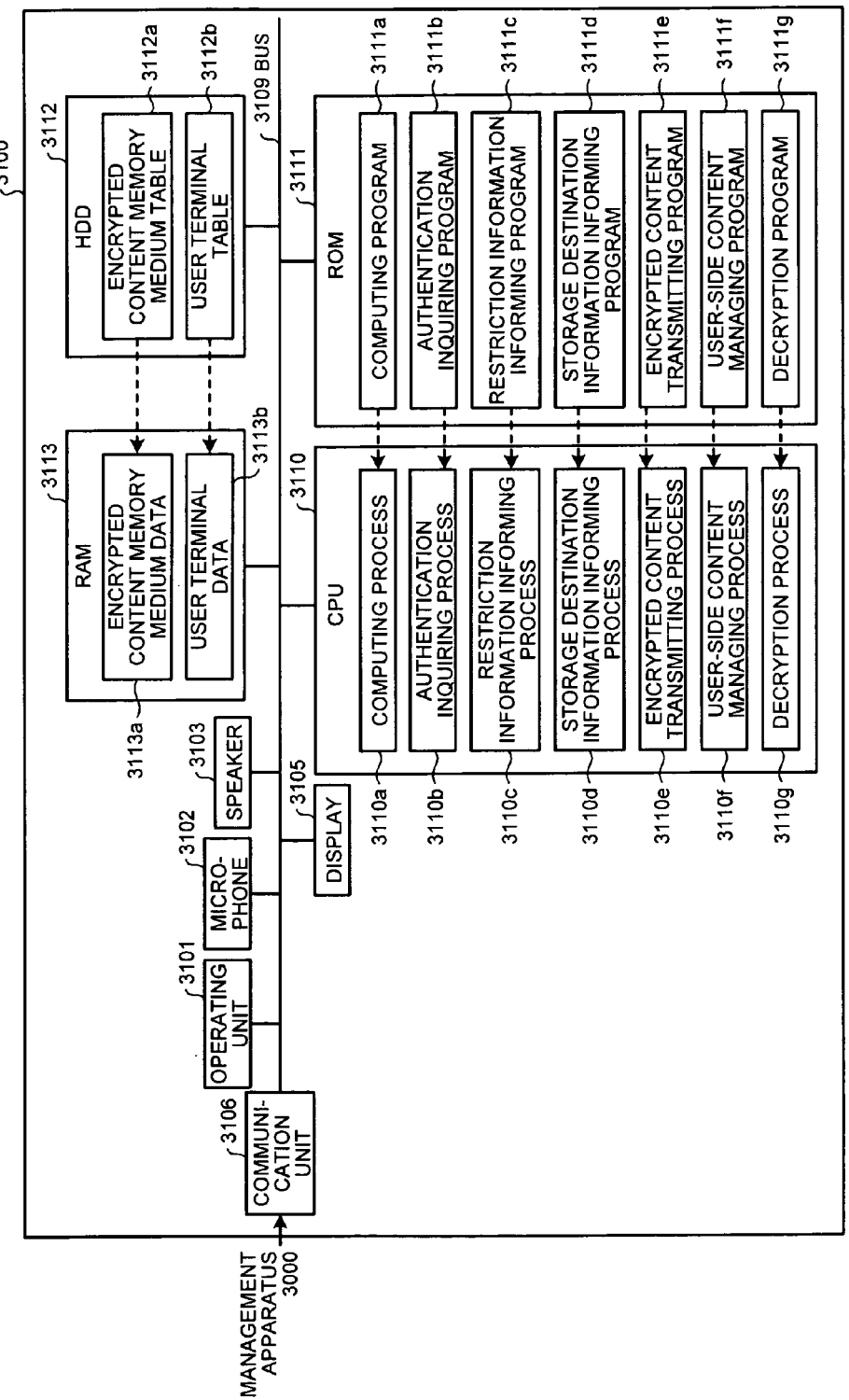

ARCHIVE SYSTEM, MANAGEMENT APPARATUS, AND CONTROL METHOD

CROSS-REFERENCE TO RELATED APPLICATION

This application is a continuation of International Application No. PCT/JP2007/072028, filed on Nov. 13, 2007, the entire contents of which are incorporated herein by reference.

FIELD

The embodiments discussed herein are directed to an archive system control program, an archive system, a management apparatus, and a control method.

BACKGROUND

Various researches have been conventionally performed on methods for managing encrypted contents. For example, a technique for assigning a random number that is set for a management ID and a file name before encryption to a hash function and using the obtained hash value as the management ID has been known as disclosed in, for example, Japanese Laid-open Patent Publication No. 2006-285697 (pages 1 to 5 and 9, FIGS. 1 and 11).

Further specifically, a file management system disclosed in Japanese Laid-open Patent Publication No. 2006-285697 includes a file storage device that stores an encrypted file, a file name before encryption, a random number for management ID, and the type of hash function and a key management device that manages a decryption key for decrypting the encrypted file and a management ID in association with each other. Under such a configuration, the file storage device transmits the file name before encryption, the random number for management ID, and the type of hash function to the key management device. Then, the key management device computes a hash value by using the received type of hash function from the received file name before encryption and random number for management ID. When there is a management ID identical to the computed hash value, the key management device transmits the corresponding decryption key to the file storage device.

Moreover, a technique for backing up data within a mobile device in a backup unit connected via a network has been known as disclosed in, for example, Japanese Laid-open Patent Publication No. 2006-211051 (pages 1, 2, and 4, FIG. 1).

However, the conventional art has a problem in that the extent of security of an archive system is not sufficient.

For example, in Japanese Laid-open Patent Publication No. 2006-285697 described above, because a hash value is computed by using a random number for management ID and a content name and is utilized as a management ID, the random number for management ID and content name leak and thus a decryption key leaks. As a result, the extent of security of an archive system is not sufficient. Moreover, in Japanese Laid-open Patent Publication No. 2006-285697, because what is used is a hash value computed from a content name and the like, interpolation cannot be detected when contents are directly interpolated with unjust data. Therefore, the extent of security of an archive system is not sufficient.

SUMMARY

According to an aspect of an embodiment of the invention, an archive system includes a user terminal that refers to an encrypted content from an encrypted content memory medium, and a management apparatus that stores a decryption key for decrypting the encrypted content that is a management target, the management apparatus acquiring management information that is information of uniquely specifying the encrypted content from the user terminal and authenticating whether a process for decrypting the encrypted content specified by the management information by using the decryption key is permitted. The user terminal includes a computing unit that reads out the encrypted content that is an authentication target from the encrypted content memory medium that stores the encrypted content in association with the management information, assigns data forming the read encrypted content to a same hash function as that of the management apparatus, and computes a first hash value. The management apparatus includes an acquiring unit that acquires the first hash value computed by the computing unit and the management information from the user terminal; a hash value authentication unit that reads out, from a management information memory unit that stores a second hash value that is a hash value that is previously computed by assigning data forming the encrypted content retaining its authenticity to the hash function in association with the management information, the corresponding second hash value by using the management information acquired by the acquiring unit as a retrieval key and authenticates whether the first hash value acquired by the acquiring unit and the second hash value are identical to each other; and a decryption control unit that permits the decryption process when an authentication result performed by the hash value authentication unit is an authentication success indicating that the first hash value and the second hash value are identical to each other.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 1 is a diagram explaining the brief and special feature of an archive system;

FIG. 2 is a flowchart illustrating a flow of the whole process performed by the archive system;

FIG. 3 is a flowchart illustrating a flow of a user authentication process performed by the archive system;

FIG. 4 is a flowchart illustrating a flow of an encrypted content authentication process performed by the archive system;

FIG. 5 is a flowchart illustrating a flow of an authentication failure process performed by the archive system;

FIG. 8 is a diagram illustrating an example of information stored in an encrypted content memory medium;

FIG. 9 is a diagram illustrating an example of information stored in a management information memory unit;

FIG. 10 is a diagram illustrating an example of information stored in a content management book memory unit;

FIG. 11 is a diagram illustrating an example of information stored in an authentication result memory unit; and FIGS. 12A and 12B are diagrams illustrating a program of the archive system according to the first embodiment.

DESCRIPTION OF EMBODIMENT(S)

Figure 6:
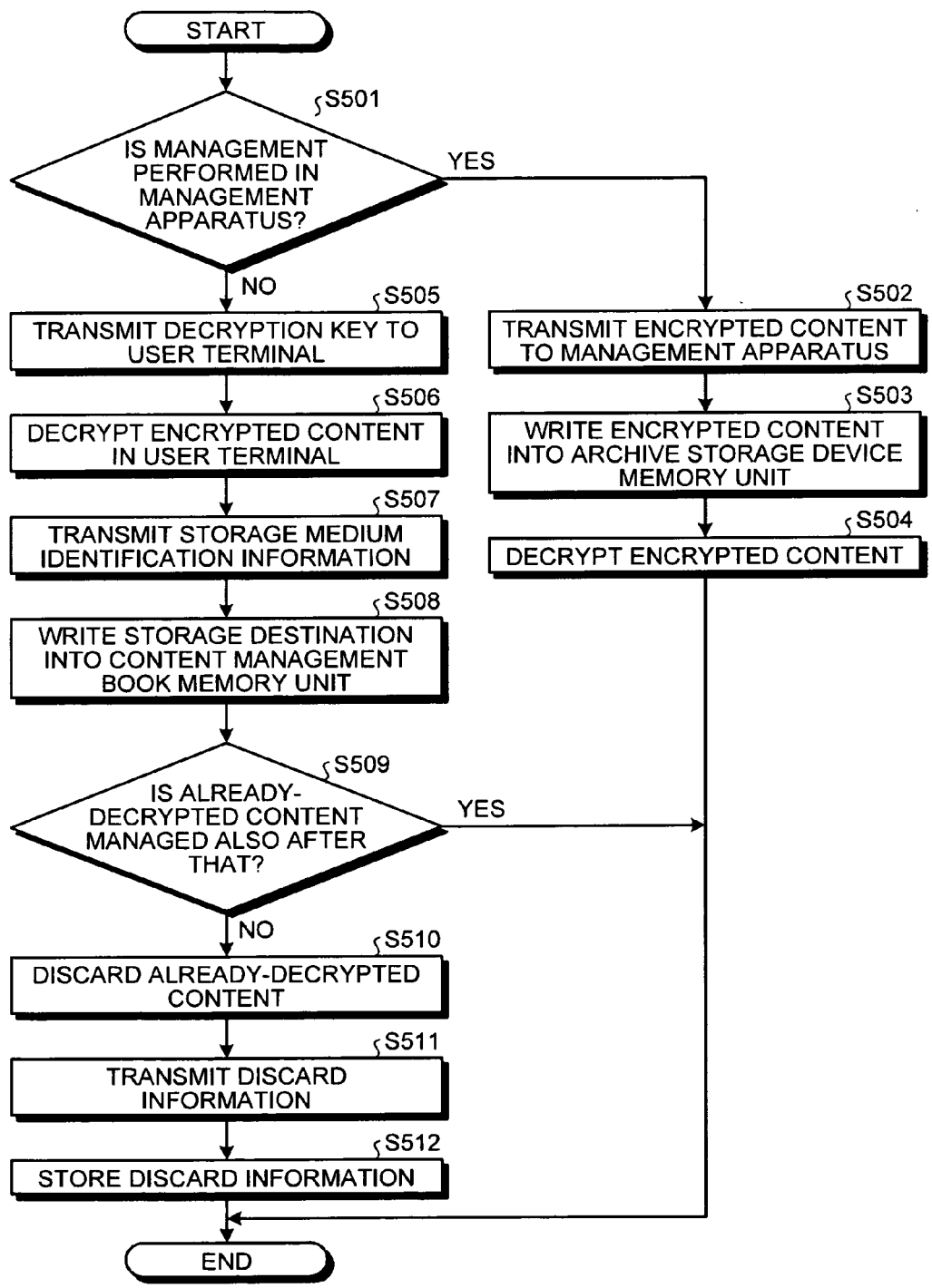
FIG. 6 is a flowchart illustrating a flow of a decryption process performed by the archive system.

Preferred embodiments of the present invention will be explained with reference to accompanying drawings. The present invention is not limited to the embodiments explained below. Hereinafter, it will be sequentially explained about main terms that are utilized in the present embodiment, the brief and special feature of an archive system, and the configuration and process flow of the archive system according to the present embodiment. Finally, it will be explained about various alternative examples for the present embodiment.

[a] First Embodiment

Explanation of Term

First, it will be explained about main terms that are utilized in the first embodiment. A user terminal is a device that refers to an encrypted content from an encrypted content memory medium. Specifically, the user terminal reads out information stored in the encrypted content memory medium. For example, the user terminal includes an optical disc drive or the like that reads the encrypted content memory medium and reads out information from the encrypted content memory medium (optical disc) provided in the user terminal. In addition, the encrypted content memory medium is a device that stores encrypted contents to be taken outside a management apparatus with the aim of backup. For example, a transportable memory medium (memory medium that can be transferred) such as a tape, an HDD, or a USB memory in addition to an optical disc corresponds to the encrypted content memory medium.

Moreover, the management apparatus according to the first embodiment is an apparatus that stores decryption keys for decrypting encrypted contents to be managed and is an apparatus that authenticates whether a process for decrypting an encrypted content stored in the encrypted content memory medium by using a decryption key is permitted or not.

It will be explained about a relationship between the user terminal, the management apparatus, and the encrypted content memory medium. First, the management apparatus and the user terminal are connected via a network (for example, wired network and wireless network) and transmit and receive information (information or decryption key required for authentication) via the network. The user terminal and the encrypted content memory medium have, for example, a relationship between a drive (media reading unit) and a media. For example, a user that uses an archive system connects the encrypted content memory medium to the user terminal and the user terminal reads information stored in the encrypted content memory medium.

Moreover, in the archive system according to the first embodiment, the number of management apparatuses, the number of user terminals, and the number of encrypted content memory media are not limited to 1:1:1. One management apparatus may correspond to many user terminals and many encrypted content memory media.

Moreover, an archive management ID (corresponding to "management information" described in Claims) that is utilized in the first embodiment uniquely specifies an encrypted content. For example, the archive management ID corresponds to a content name (file name) that indicates content (or encrypted content), identification information (for example, ID) added in addition to the content name with the aim of uniquely specifying the encrypted content in archive storage, and the like.

Moreover, a hash function that is utilized in the first embodiment is a function or a procedure for computing a hash value that is constant-length data from the list of a character string of a document, a number, and the like. Because a hash function that is utilized in the first embodiment includes one-way function that is an irreversible function, an original text cannot be reproduced from the hash value. Furthermore, it is virtually impossible to create different data having the same hash value.

Brief and Special Feature of Archive System

Next, it will be explained about the brief and special feature of an archive system according to the first embodiment with reference to FIG. 1. FIG. 1 is a diagram explaining the brief and special feature of an archive system.

As illustrated in FIG. 1, the archive system according to the first embodiment includes a user terminal 100 and a management apparatus 200 that are connected via a network. An encrypted content memory medium 300 is connected to the user terminal 100. In the archive system according to the first embodiment, the management apparatus 200 acquires management information from the user terminal 100 and authenticates whether a process for decrypting an encrypted content specified by the management information by using a decryption key is permitted. The archive system having such a brief has the main characteristics in that the security of an archive system can be improved as explained below.

It will be explained about the main characteristics. First, in the archive system according to the first embodiment, the encrypted content memory medium 300 stores an encrypted content in association with management information. For example, as illustrated in the encrypted content memory medium 300 of FIG. 1, the encrypted content memory medium 300 stores management information "00A1" and an encrypted content in association with each other.

Moreover, in the archive system according to the first embodiment, the management apparatus 200 stores a second hash value 20 that is a hash value that is previously computed by assigning data forming an encrypted content retaining its authenticity to a hash function in a management information memory unit 211 in association with the management information. For example, as illustrated in FIG. 1, the management information memory unit 211 stores the management information "00A1" and the second hash value 20 in association with each other. Furthermore, in the first embodiment, it will be explained about the case where a decryption key (the picture of key referred to as a symbol A in FIG. 1) for decrypting the corresponding encrypted content is further stored in association with the management information.

In this case, the first embodiment has a characteristic in that the second hash value 20 is computed from data forming an encrypted content retaining its authenticity. For example, the second hash value 20 is computed when this encrypted content is stored in the encrypted content memory medium 300 or when this encrypted content is expected to be managed by the archive system according to the first embodiment. As a result, the second hash value 20 is computed as a value that is not affected at all by the change of data caused by the degradation of the encrypted content memory medium 300, the interpolation of unjust data, and the like, and is stored in the management information memory unit 211 in the state where the value is not affected by these. Moreover, in the first embodiment, it will be explained about a technique for computing the second hash value 20 from all data forming an encrypted content.

Under such a configuration, in the archive system according to the first embodiment, the user terminal 100 reads out an encrypted content that is an authentication target from the encrypted content memory medium 300, assigns data forming the read encrypted content to the same hash function as that of the management apparatus 200, and computes a first hash value 10. For example, as illustrated in (1) of FIG. 1, the user terminal 100 computes the first hash value 10 from data forming an encrypted content that is an authentication target.

It should be noted that the first embodiment has a characteristic in that the first hash value 10 is computed by using data forming an encrypted content in addition to a file name or the like that is information given to simply identify the encrypted content. For example, the first hash value 10 is computed in each case when an encrypted content to be authenticated is designated (or when the management apparatus 200 acquires information required for authentication). As a result, when the hash value is affected by the change of data caused by the degradation of the encrypted content memory medium 300, the interpolation of unjust data, and the like in the case of authentication, the first hash value 10 is computed as a value that is affected by these (on which these is reflected). In addition, in the first embodiment, it will be explained about a technique for computing the first hash value 10 from all data forming an encrypted content.

In the archive system according to the first embodiment, the management apparatus 200 acquires the first hash value 10 computed by the user terminal 100 and the management information from the user terminal 100. For example, as illustrated in (2) of FIG. 1, the management apparatus 200 acquires the management information "00A1" and the first hash value 10.

Then, in the archive system according to the first embodiment, the management apparatus 200 reads out the corresponding second hash value 20 from the management information memory unit 211 by using the acquired management information as a retrieval key and authenticates whether the acquired first hash value 10 and second hash value 20 are identical to each other. For example, as illustrated in (3) of FIG. 1, the management apparatus 200 authenticates whether the first hash value 10 and the second hash value 20 associated with the same management information are identical to each other.

Then, in the archive system according to the first embodiment, the management apparatus 200 permits a decryption process when the authentication result is an authentication success in that the first hash value 10 and the second hash value 20 are identical to each other. For example, as illustrated in (4) of FIG. 1, when the first hash value 10 and the second hash value 20 are identical to each other, the management apparatus 200 permits a process for decrypting the encrypted content that is uniquely identified by the acquired management information, and the management apparatus 200 or the user terminal 100 performs the process decrypting the encrypted content by using a decryption key.

Because of this, the archive system according to the first embodiment can improve the security of an archive system like the above-described main characteristics.

For example, in a technique that the user terminal 100 transmits only a management ID to the management apparatus 200 and acquires a decryption key (an example of a process using a decryption key) or a technique that the user terminal 100 computes a hash value from a content name to transmit the hash value to the management apparatus 200 and acquires a decryption key, the management ID and the content name leak and thus the decryption key easily leaks. However, according to the present invention, because a user terminal cannot compute and transmit a hash value required for authentication unless an encrypted content is retained, the simple leakage of a decryption key can be prevented and thus the security of an archive system can be improved.

Moreover, because an encrypted content is not directly transmitted to the management apparatus 200 and a hash value computed from the encrypted content is transmitted to the management apparatus 200, the leakage of an encrypted content can be prevented in the case of an authentication process and thus the security of an archive system can be improved.

Moreover, according to the present invention, for example, when a memory medium that stores an encrypted content degrades and errors occur in the encrypted content, the management apparatus 200 authenticates that a hash value computed from the encrypted content has a difference. As a result, because the management apparatus 200 can grasp that the encrypted content has a problem, the security of an archive system can be improved.

Moreover, according to the present invention, for example, when a third party interpolates an encrypted content, the management apparatus 200 authenticates that a hash value computed from the encrypted content has a difference. As a result, because the management apparatus 200 can grasp that the encrypted content has a problem, the security of an archive system can be improved.

Process by Archive System

Next, it will be explained about processes performed by the archive system with reference to FIGS. 1 to 6. FIG. 2 is a flowchart illustrating a flow of the whole process performed by the archive system. FIG. 3 is a flowchart illustrating a flow of a user authentication process performed by the archive system. FIG. 4 is a flowchart illustrating a flow of an encrypted content authentication process performed by the archive system. FIG. 5 is a flowchart illustrating a flow of an authentication failure process performed by the archive system. FIG. 6 is a flowchart illustrating a flow of a decryption process performed by the archive system. Moreover, the reference numbers of units described in the following explanation are numbers based on FIG. 7.

In addition to an "encrypted content authentication process" for computing a hash value from data forming an encrypted content and performing authentication that is the characteristic of the invention, the archive system together performs, as processes that respectively have special features, a "user authentication process" for authenticating whether a user has authority that can access the archive system, an "access user authentication process" for authenticating whether a user has authority that can access each content, a "restriction information confirmation process" for confirming whether there is information that restricts the decryption of an encrypted content, an "authentication failure process" that is a process performed when the encrypted content authentication process fails, and a "decryption process" that is a process performed when the encrypted content authentication process succeeds.

Hereinafter, in the description related to the whole process performed by the archive system, it will be mainly explained about a relationship between individual processes in the flow of the whole process for the other processes of an encrypted content. After that, in the description related to user authentication performed by the archive system, it will be explained about the "user authentication process". Next, in the description related to encrypted content authentication performed by the archive system, it will be explained about the "encrypted content authentication process" and the "access user authentication process". After that, in the description related to the authentication failure process performed by the archive system, it will be explained about the "authentication failure process". Then, in the description related to the decryption process performed by the archive system, it will be explained about the "decryption process".

It should be noted that the archive system according to the present invention must not necessarily use all the processes together. Therefore, the archive system may perform only an arbitrary process.

Whole Process by Archive System

First, it will be explained about a flow of the whole process performed by the archive system with reference to FIG. 2.

As illustrated in FIG. 2, when an archive management ID is designated in the user terminal 100 (Step S101: YES), the archive system performs a user authentication process (Step S102).

In this case, when the user authentication process fails (Step S103: NO), the archive system terminates the process. On the other hand, when the user authentication process succeeds (Step S103: YES), the archive system performs an encrypted content authentication process (Step S104).

In this case, when the authentication result is a failure (Step S105: NO), the archive system performs an authentication failure process (Step S106) and terminates the process.

On the other hand, when the authentication result is a success (Step S105: YES), the archive system performs a restriction information confirmation process (Step S107). In other words, for example, in the management apparatus 200, an authenticating unit 222 retrieves an authentication result memory unit 213 by using the acquired archive management ID as a retrieval key and confirms whether an authentication failure result or memory medium anomaly information is stored in the authentication result memory unit 213 in associated with the archive management ID. In the case of the explanation using an example of FIG. 11, the authenticating unit 222 authenticates that the authentication failure result or the memory medium anomaly information is not stored in the authentication result memory unit 213 when using an archive management ID "0011" as a retrieval key. On the other hand, the authenticating unit 222 authenticates that the authentication failure result is stored in the authentication result memory unit 213 when using an archive management ID "0012" as a retrieval key.

Then, when the management apparatus 200 (the authenticating unit 222) determines that there is restriction information (Step S108: YES), a decryption control unit 223 in the archive system informs the user terminal 100 of the content of restriction (Step S109). After that, in the user terminal 100, a restriction information informing unit 123 outputs the informed content of restriction (Step S110). In other words, for example, the restriction information informing unit 123 informs it of the presence of authentication failure result and informs it of the presence of memory medium anomaly information.

On the other hand, when the management apparatus 200 (the authenticating unit 222) determines that there is not restriction information (Step S108: NO), the archive system performs a decryption process (Step S111) and terminates the process.

User Authentication Process by Archive System

Next, it will be explained about a flow of the user authentication process performed by the archive system with reference to FIG. 3.

As illustrated in FIG. 3, in the user terminal 100, an authentication inquiring unit 122 acquires authentication destination information and the archive management ID from the encrypted content memory medium 300 (Step S201). Then, the authentication inquiring unit 122 accesses the management apparatus 200 by using the acquired authentication destination information (Step S202) and transmits an access user as information required for the user authentication process (Step S203). In other words, for example, when a user inputs "Ichiro Yamada" as an access user, the authentication inquiring unit 122 transmits "Ichiro Yamada".

Then, in the management apparatus 200, the authenticating unit 222 performs the user authentication process when receiving the access user from the authentication inquiring unit 122 (Step S204). In other words, the authenticating unit 222 authenticates whether the received access user is a user that can access the management apparatus 200. Then, the authenticating unit 222 transmits the authentication result to the user terminal 100 (Step S205). For example, the authenticating unit 222 transmits an authentication success when the received access user is a user that can access the management apparatus 200 and transmits an authentication failure when the received access user is a user that cannot access the management apparatus 200.

Then, in the user terminal 100, the authentication inquiring unit 122 receives the authentication result related to the user authentication process from the authenticating unit 222 (Step S206). Then, the authentication inquiring unit 122 determines whether the authentication result is an authentication success (Step S103 of FIG. 2).

Encrypted Content Authentication Process by Archive System

Next, it will be explained about a flow of the encrypted content authentication process performed by the archive system with reference to FIG. 4. Moreover, it will be together explained about an access user authentication process.

As illustrated in FIG. 4, when the user authentication process succeeds (Step S103: YES in FIG. 2), a computing unit 121 in the user terminal 100 computes a first hash value (Step S301). In other words, for example, when the user that uses the user terminal 100 designates an instruction of referring to an encrypted content and an archive management ID of indicating the encrypted content to be referred to from an input unit, the computing unit 121 computes the first hash value from data forming the encrypted content. As a specific example, the computing unit 121 computes the first hash value from the whole of the encrypted content that is associated with the archive management ID. In other words, the computing unit 121 assigns data forming the read encrypted content to the same hash function as that of the management apparatus 200 and computes the first hash value.

Then, in the user terminal 100, the authentication inquiring unit 122 transmits the archive management ID and the first hash value to the management apparatus 200 (Step S302).

Then, in the management apparatus 200, the authenticating unit 222 determines whether the hash value is identical to a hash value that is stored (Step S303). For example, the authenticating unit 222 determines whether the received first hash value is identical to a second hash value that is stored in the management information memory unit 211 in association with the received archive management ID. Furthermore, as a specific example, the authenticating unit 222 determines whether the hash values are identical to each other (the encrypted content authentication process) and determines whether the received access user is identical to an access user that is stored in the management information memory unit 211 in association with the received archive management ID (the access user authentication process). In this case, when it is determined that the hash values and the access users are identical to each other, the authenticating unit 222 determines that the authentication result is a success. On the other hand, when it is determined that the hash values and the access users are not identical to each other, the authenticating unit 222 determines that the authentication result is a failure. Then, the authenticating unit 222 determines whether the encrypted content authentication process succeeds or not (Step S105 of FIG. 2).

Authentication Failure Process by Archive System

Next, it will be explained about a flow of the authentication failure process performed by the archive system with reference to FIG. 5. In the following process, it will be explained about the case where an authentication failure result is obtained for the archive management ID "0012".

As illustrated in FIG. 5, when the authenticating unit 222 determines that the authentication result is a failure (Step S105: NO in FIG. 2), an authentication result storage unit 225 in the management apparatus 200 writes the received access user and the received archive management ID into an authentication result management memory unit (Step S401).

Then, in the management apparatus 200, the decryption control unit 223 transmits the effect that the authentication result is a failure to the user terminal 100 (Step S402). In other words, for example, the decryption control unit 223 informs the user terminal 100 of the effect that the archive management ID "0012" cannot be referred to.

Then, in the user terminal 100, the restriction information informing unit 123 outputs the effect that it cannot be referred to from the output unit (Step S403). In other words, for example, the restriction information informing unit 123 outputs the effects that the authentication result is a failure and that it cannot be referred to, for the archive management ID "0012".

Then, in the management apparatus 200, the authentication result storage unit 225 stores the authentication failure result in the authentication result memory unit 213 in association with the received archive management ID (Step S404). For example, as illustrated in FIG. 11, the authentication result storage unit 225 stores the "presence" of the authentication failure result in the authentication result memory unit 213 in association with the archive management ID "0012".

Then, in the management apparatus 200, the authentication result storage unit 225 acquires the identification information of the encrypted content memory medium 300 in which an encrypted content associated with the received archive management ID is stored (Step S405). In other words, for example, in the case of the explanation using an example illustrated in FIG. 9, the authentication result storage unit 225 acquires memory medium identification information "A2222" in which the encrypted content associated with the archive management ID "0012" is stored. Next, the authentication result storage unit 225 acquires an archive management ID associated with the acquired memory medium identification information (Step S406). For example, in the case of the explanation using the example illustrated in FIG. 9, the authentication result storage unit 225 acquires archive management IDs "0013" and "0014" that are associated with the memory medium identification information "A2222".

Then, in the management apparatus 200, the authentication result storage unit 225 stores memory medium anomaly information in association with the acquired archive management ID (Step S407). In other words, in the case of the explanation using the example of FIG. 11, the authentication result storage unit 225 stores the "presence" of memory medium anomaly information in the authentication result memory unit 213, which is in association with the acquired archive management IDs "0013" and "0014". Then, the management apparatus 200 terminates the process.

Decryption Process by Archive System

Next, it will be explained about a flow of the decryption process performed by the archive system with reference to FIG. 6. In the following process, it will be explained about the case where an authentication success result is obtained and restriction information is not obtained for the archive management ID "0011".

As illustrated in FIG. 6, when the authenticating unit 222 determines that there is not restriction information (Step S108: YES in FIG. 2), the decryption control unit 223 in the management apparatus 200 determines whether management is performed in the management apparatus 200 as a reference method of an encrypted content (Step S501). In other words, the decryption control unit 223 determines whether an encrypted content is decrypted and managed in the management apparatus 200 or whether an encrypted content is decrypted and managed in the user terminal 100.

In this case, when the decryption control unit 223 determines that an encrypted content is managed in the management apparatus 200 (Step S501: YES), in other words, when the instruction of the effect that an encrypted content is decrypted and managed in the management apparatus 200 is input into the user terminal 100 from the user and the management apparatus 200 receives the signal of that effect, an encrypted content transmitting unit 125 in the user terminal 100 transmits (uploads) an encrypted content to be referred to the management apparatus 200 (Step S502).

It has been explained about the case where the decryption control unit 223 receives the instruction from the user in the case of the determination whether the content is managed in the management apparatus 200. However, the present invention is not limited to this. The decryption control unit may determine whether the content is managed in the management apparatus 200 on the basis of the matter that is previously set without receiving the instruction from the user. For example, each content may be stored as a table in association with a place (for example, management apparatus, specific user terminal (or memory unit), or the like) to be referred to and be referred to by using the table.

Then, in the management apparatus 200, a management-apparatus content managing unit 226 writes the received encrypted content into an archive storage device memory unit 214 (Step S503). Then, the management-apparatus content managing unit 226 acquires a decryption key corresponding to the uploaded encrypted content from the management information memory unit 211 and decrypts the uploaded encrypted content (Step S504). In other words, for example, in the case of the explanation using the example illustrated in FIG. 9, the management-apparatus content managing unit 226 acquires a decryption key "key A" associated with the archive management ID "0011" and decrypts the uploaded encrypted content by using the key A. Then, the process is terminated.

On the other hand, in the management apparatus 200, when it is determined that an encrypted content is not managed in the management apparatus 200 (Step S501: NO), in other words, when the instruction of decrypting and managing the encrypted content in the user terminal 100 is input into the user terminal 100 from the user and the management apparatus 200 receives the signal of that effect, the decryption control unit 223 acquires a decryption key corresponding to an encrypted content to be referred to from the management information memory unit 211 and transmits the decryption key to the user terminal 100 (Step S505). In other words, for example, in the case of the explanation using the example illustrated in FIG. 9, the decryption control unit 223 acquires the decryption key "key A" associated with the archive management ID "0011" and transmits the key A to the user terminal 100.

Then, in the user terminal 100, a decrypting unit 127 decrypts the encrypted content to be referred to by using the decryption key received from the management apparatus 200 (Step S506). For example, the decrypting unit 127 decrypts the encrypted content corresponding to the archive management ID "0011" by using the acquired key A.

Then, in the user terminal 100, a storage destination information informing unit 124 transmits storage medium identification information of uniquely identifying the memory medium of the user terminal 100 that stores the decrypted content by the user terminal 100 (Step S507). In other words, for example, in the case of the explanation using the example illustrated in FIG. 9, when the content decrypted by the user terminal 100 is stored in a user terminal memory unit 110, the storage destination information informing unit 124 transmits the effect that the memory of the decrypted content is the user terminal memory unit 110. For further details, for example, the storage destination information informing unit 124 transmits storage medium identification information "B111".

Next, in the management apparatus 200, a content management book storage unit 224 writes a place at which the received already-decrypted content is stored into a content management book memory unit 212 (Step S508). For example, in the case of the explanation using an example of FIG. 10, the content management book storage unit 224 stores the storage medium identification information "B111" in the content management book memory unit 212 in association with the archive management ID "0011".

After that, in the user terminal 100, a user-terminal content managing unit 126 determines whether the already-decrypted content is managed in the user terminal 100 also after that (Step S509). In other words, for example, it is determined whether the already-decrypted content is managed in the user terminal 100 also after that without deleting the already-decrypted content after referring to the already-decrypted content. In this case, when it is determined that the already-decrypted content is managed also after that (Step S509: YES), the user-terminal content managing unit 126 terminates the process. On the other hand, when it is determined that the already-decrypted content is not managed (Step S509: NO), the user-terminal content managing unit 126 discards the already-decrypted content (Step S510) and transmits discard information indicating the effect that the already-decrypted content is discarded to the management apparatus 200 (Step S511).

Then, when receiving the effect that the already-decrypted content is discarded, the content management book storage unit 224 in the management apparatus 200 stores the discard information in the content management book memory unit 212 in association with the corresponding archive management ID (Step S512). In other words, for example, the content management book storage unit 224 stores discard information "already-discarded" in association with the archive management ID "0011". Then, the process is terminated.

Configuration of Archive System

Figure 7:
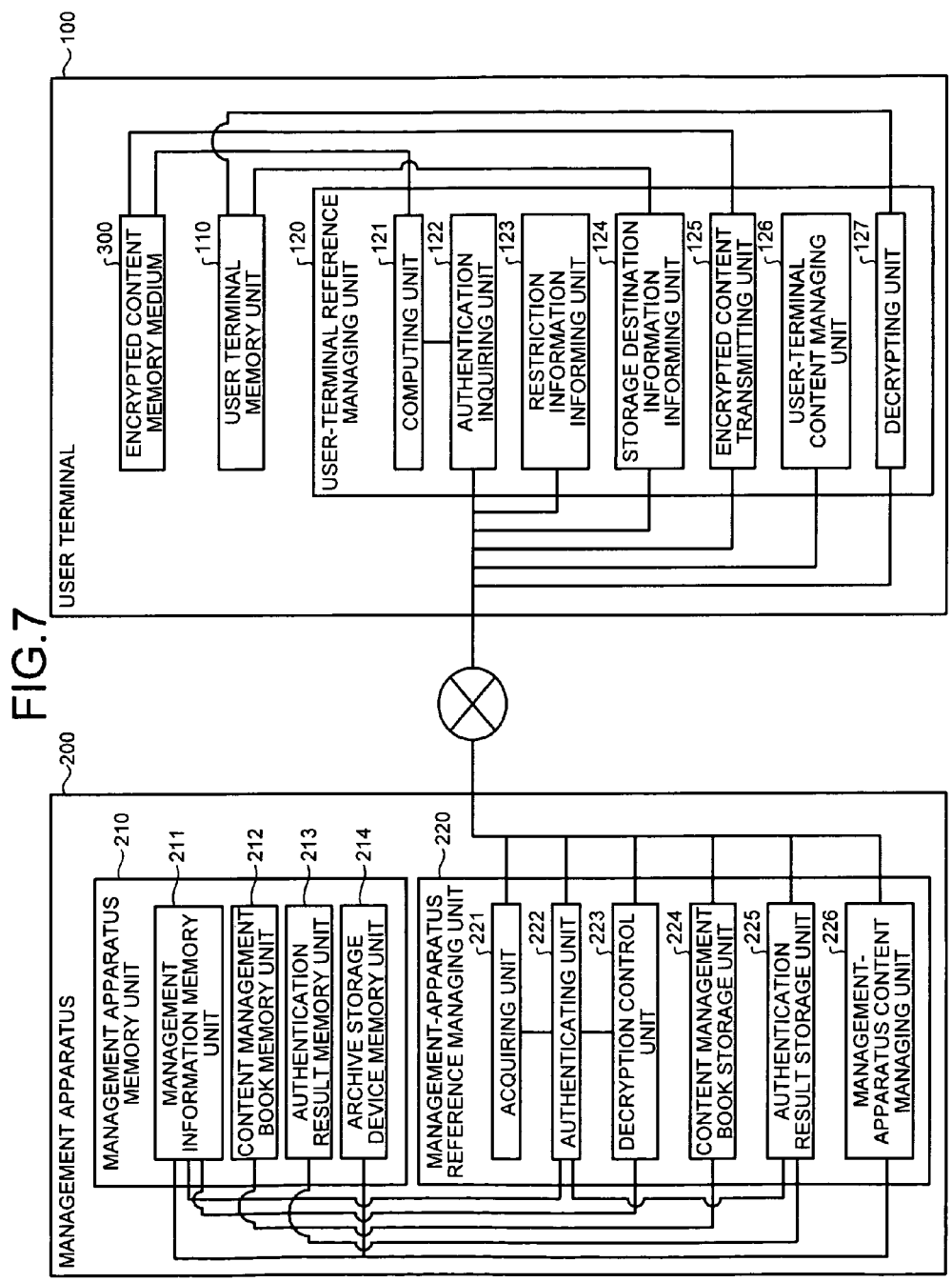
FIG. 7 is a block diagram illustrating the configuration of the archive system.

Next, it will be explained about the configuration of the archive system illustrated in FIG. 1 with reference to FIGS. 7 to 11. As illustrated in FIG. 7, the archive system includes the user terminal 100 and the management apparatus 200. FIG. 7 is a block diagram illustrating the configuration of the archive system. FIG. 8 is a diagram illustrating an example of information stored in the encrypted content memory medium 300. FIG. 9 is a diagram illustrating an example of information stored in the management information memory unit 211. FIG. 10 is a diagram illustrating an example of information stored in the content management book memory unit 212. FIG. 11 is a diagram illustrating an example of information stored in the authentication result memory unit 213.

The user terminal 100 includes the encrypted content memory medium 300, the user terminal memory unit 110, and a user-terminal reference managing unit 120. The management apparatus 200 includes a management apparatus memory unit 210 and a management-apparatus reference managing unit 220. In this case, the user terminal memory unit 110 corresponds to a "user terminal memory medium" described in Claims.

Although they are not illustrated in FIG. 7, the user terminal 100 may include an input unit that receives various types of information and an output unit that outputs various types of information. In this case, an input unit corresponds to a keyboard, a mouse, a microphone, and the like. For example, the input unit receives an instruction of the effect that the archive system performs the user authentication process from a user who uses the user terminal 100. Moreover, the input unit receives an instruction of the effect that the decrypted content is managed in the user terminal 100 or an instruction of the effect that the decrypted content is managed in the management apparatus 200. An output unit corresponds to a monitor (or a display, a touch panel), a speaker, and the like. For example, the output unit displays an authentication result performed by the authentication inquiring unit 122 to be described below (or outputs the authentication result from a speaker by voice).

User Terminal Memory Unit

The encrypted content memory medium 300 stores an encrypted content in association with management information. For example, the encrypted content memory medium 300 stores a plurality of encrypted contents. Moreover, the encrypted content memory medium 300 has memory medium identification information that is information of uniquely identifying the encrypted content memory medium 300. For example, as illustrated in FIG. 8, the encrypted content memory medium 300 stores an encrypted content in association with an archive management ID and further stores memory medium identification information and authentication destination information that is information of uniquely specifying the management apparatus 200 in a network.

As a further specific example, in an example illustrated in FIG. 8, the encrypted content memory medium 300 stores the memory medium identification information "A0112" of the encrypted content memory medium 300 and authentication destination information "211.9 . . . (IP address)", stores the archive management ID "0011" and an encrypted content "A (described as a picture illustrating an encrypted content in which "A" is described in FIG. 8)" in association with each other, and stores the archive management ID "0012" and an encrypted content "B (described as a picture illustrating an encrypted content in which "B" is described in FIG. 8)" in association with each other.

The user terminal memory unit 110 stores data and an authentication program required for various types of processes performed by the user-terminal reference managing unit 120. For example, the user terminal memory unit 110 stores the content decrypted by the decrypting unit 127 to be described below as data required for various types of processes. Moreover, the user terminal memory unit 110 has user terminal memory medium identification information that is information of uniquely identifying it from other memory media or memory units. For example, when the user terminal 100 decrypts an encrypted content as described below, the user terminal memory unit 110 stores the decrypted content.

Management Apparatus Memory Unit

The management apparatus memory unit 210 stores data and an authentication program required for various types of processes performed by the management-apparatus reference managing unit 220. As units closely relevant to the present invention, as illustrated in FIG. 7, the management apparatus memory unit 210 includes the management information memory unit 211, the content management book memory unit 212, the authentication result memory unit 213, and the archive storage device memory unit 214. In this case, the management information memory unit 211 corresponds to a "management information memory unit" described in Claims, the content management book memory unit 212 corresponds to a "content management book memory unit" described in Claims, the authentication result memory unit 213 corresponds to an "authentication result memory unit" described in Claims, and the archive storage device memory unit 214 corresponds to a "management apparatus memory unit" described in Claims.

The management information memory unit 211 previously stores a second hash value, which is a hash value that is previously computed by assigning data forming an encrypted content retaining its authenticity to a hash function, in association with an archive management ID. Moreover, the management information memory unit 211 further stores memory medium identification information (information of uniquely identifying the encrypted content memory medium 300 that stores an encrypted content specified by an archive management ID in association with the archive management ID). For example, as illustrated in FIG. 9, the management information memory unit 211 stores, in association with an archive management ID, a second hash value, a "decryption key" that indicates a key for use in a process for decrypting an encrypted content specified by the archive management ID, an "access user" that indicates a user that can access the encrypted content specified by the archive management ID, and memory medium identification information.

As a further specific example, as illustrated in FIG. 9, the management information memory unit 211 stores the archive management ID "0011", the second hash value "A246K8 . . . ", the decryption key "key A", the access user "Ichiro Yamada", and the memory medium identification information "A0112" in association with one another. The management information memory unit 211 stores the archive management ID "0012", the second hash value "B3453 . . . ", the decryption key "key B", the access users "Ichiro Yamada and Jiro Yamada", and the memory medium identification information "A2222" in association with one another.

It should be noted that the present invention has a characteristic in that the second hash value is computed from data forming an encrypted content retaining its authenticity. For example, the second hash value is computed when the encrypted content is stored in the encrypted content memory medium 300 or when the encrypted content is managed by the archive system according to the first embodiment. As a result, the second hash value is computed as a value that is not affected at all by the change of data caused by the degradation of the encrypted content memory medium 300, the interpolation of unjust data, and the like, and, is stored in the management information memory unit 211 in the state where the value is not affected by these.

The content management book memory unit 212 stores storage medium identification information (information of uniquely identifying the user terminal memory medium into which the decrypted content is written by the user terminal 100) and information of the effect that the corresponding content is discarded. For example, as illustrated in FIG. 10, the content management book memory unit 212 stores the storage medium identification information and the effect of discard in association with an archive management ID. In addition, the storage medium identification information is stored by the content management book storage unit 224 to be described below. As a further specific example, in the example illustrated in FIG. 10, the content management book memory unit 212 stores the storage medium identification information "B111" and "already-discarded" that is information indicating the effect of discard in association with the archive management ID "0011".

When the authentication result of encrypted content authentication performed by the authenticating unit 222 to be described below is an authentication failure result (authentication result indicating the effect that the first hash value and the second hash value are not identical to each other), the authentication result memory unit 213 stores the authentication failure result in association with the archive management ID. Moreover, the authentication result memory unit 213 stores memory medium anomaly information indicating that the encrypted content memory medium 300 has some kind of anomaly in association with the archive management ID. In addition, the authentication result is stored by the authentication result storage unit 225 to be described below. For example, as illustrated in FIG. 11, the authentication result memory unit 213 stores the authentication failure result and the memory medium anomaly information in association with the archive management ID. As a further specific example, in the example illustrated in FIG. 11, the authentication result memory unit 213 stores the "presence" of authentication failure result in association with the archive management ID "0012" and stores the "presence" of memory medium anomaly information in association with the archive management ID "0013".

In the first embodiment, it has been explained about the case where only the "presence" is stored as the authentication failure result and memory medium anomaly information. However, the present invention is not limited to this. Information of the effect that access is prohibited for a constant time may be written or information of the effect that access by users within a specific range is prohibited may be written.

The archive storage device memory unit 214 stores an encrypted content, a decrypted content, and the like. For example, when a content to be decrypted is managed by the management apparatus 200, the archive storage device memory unit 214 stores an encrypted content uploaded from the user terminal 100 and stores a content that is obtained by decrypting the encrypted content.

User-Terminal Reference Managing Unit

The user-terminal reference managing unit 120 has a memory that stores an authentication control program, a program that defines various types of processing procedures, and required data and executes various processes by using these. As units closely relevant to the present invention, the user-terminal reference managing unit 120 includes the computing unit 121, the authentication inquiring unit 122, the restriction information informing unit 123, the storage destination information informing unit 124, the encrypted content transmitting unit 125, the user-terminal content managing unit 126, and the decrypting unit 127. In addition, the computing unit 121 corresponds to a "computation step" described in Claims.

The computing unit 121 reads out an encrypted content that is an authentication target from the encrypted content memory medium 300, assigns data forming the read encrypted content to the same hash function as that of the management apparatus 200, and computes the first hash value. Specifically, the computing unit 121 computes the first hash value by using data forming an encrypted content in addition to a file name or the like that is information given to simply identify the encrypted content.

For example, when computing the first hash value, the computing unit 121 sets all data forming an encrypted content as data to be assigned to a hash function and computes the first hash value. In other words, the computing unit 121 computes the first hash value from the entire matter of an encrypted content that is associated with an archive management ID. Moreover, for example, the computing unit 121 computes the first hash value every time an encrypted content to be authenticated is designated (or every time the management apparatus 200 acquires information required for authentication).

The present invention has a characteristic in that the first hash value is computed by using data forming an encrypted content in addition to a file name or the like that is information given to simply identify the encrypted content. For example, the first hash value is computed every time an encrypted content to be authenticated is designated (or every time the management apparatus 200 acquires information required for authentication). As a result, in the case of performing authentication, when the first hash value is affected by the change of data caused by the degradation of the encrypted content memory medium 300, the interpolation of unjust data, and the like, the first hash value is computed as a value that is affected by these (these are reflected on the value).

In this case, the computing unit 121 computes the first hash value from the corresponding encrypted content by using the same hash function as that used when the second hash value is computed from the corresponding encrypted content retaining its authenticity.

In the present embodiment, it has been explained about the case where the computing unit 121 sets all data forming an encrypted content as data to be assigned to a hash function when computing the first hash value. However, the present invention is not limited to this. The computing unit 121 may set only the part of an encrypted content and compute the first hash value. As a result, a time required for the computation process of the first hash value that is performed every authentication can be shortened and the authentication process can be quickly performed.

The authentication inquiring unit 122 transmits information required in performing the user authentication process and the encrypted content authentication process to the management apparatus 200. For example, in the case of the user authentication process, the authentication inquiring unit 122 acquires the authentication destination information and the archive management ID from the encrypted content memory medium 300. Then, the authentication inquiring unit 122 accesses the management apparatus 200 by using the acquired authentication destination information and transmits an access user as information required for the user authentication process. In other words, for example, when "Ichiro Yamada" is input by a user as an access user, the authentication inquiring unit 122 transmits "Ichiro Yamada".

Then, the authentication inquiring unit 122 receives an authentication result related to the user authentication process from the authenticating unit 222 to be described below. Then, the authentication inquiring unit 122 determines whether the authentication result is an authentication success.

In this case, the user authentication process corresponds to, for example, a process for performing login to a system. In the first embodiment, it has been explained about the case where the user authentication process authenticates whether a user who uses the user terminal 100 is a user who can utilize the archive system (or who can access the management apparatus 200). However, the present invention is not limited to this. By using determining whether access to the management apparatus 200 is performed from which of the user terminals 100, the user authentication process may authenticate whether the access is access from the appropriate user terminal 100 constituting the archive system.

Moreover, in the present embodiment, in the case of the user authentication process, it has been explained about the case where the authentication inquiring unit 122 transmits only an access user. However, the present invention is not limited to this. The authentication inquiring unit 122 may transmit a password (for example, password given to each access user) along with the access user to prevent the abuse of the archive system.

Moreover, in the case of the encrypted content authentication process, the authentication inquiring unit 122 transmits the archive management ID and the first hash value to the management apparatus 200. For example, the authentication inquiring unit 122 acquires the archive management ID from the encrypted content memory medium 300 and transmits the archive management ID along with the first hash value computed from the computing unit 121 to the management apparatus 200.

The restriction information informing unit 123 informs the user of the confirmation result of the restriction information confirmation process. The confirmation result is received from the management apparatus 200 (the decryption control unit 223). For example, the restriction information informing unit 123 outputs the informed content of restriction. In other words, for example, the restriction information informing unit 123 outputs the "presence" of authentication failure result and informs the user of the "presence" of memory medium anomaly information. Moreover, for example, the restriction information informing unit 123 outputs the effect that it cannot be referred to. In other words, for example, the restriction information informing unit 123 outputs the effect that it is an authentication failure and cannot be referred to from the output unit. In other words, for example, the restriction information informing unit 123 outputs the effect that it is an authentication failure with respect to the archive management ID "0012" and cannot be referred to from the output unit.

The storage destination information informing unit 124 transmits storage medium identification information of uniquely identifying the user terminal memory medium into which the decrypted content is written by the user terminal 100 to the management apparatus 200. For example, when the content decrypted by the user terminal 100 is stored in the user terminal memory unit 110, the storage destination information informing unit 124 transmits the effect that it is the user terminal memory unit 110. For further details, for example, the storage destination information informing unit 124 transmits the storage medium identification information "B111" that indicates the user terminal 100 into which a content is written.

In the decryption process, the encrypted content transmitting unit 125 transmits (uploads) an encrypted content that is decrypted by the management apparatus 200 and is referred to afterward to the management apparatus 200.

The user-terminal content managing unit 126 determines whether the already-decrypted content is managed by the user terminal 100 also after that. For example, in the user terminal 100, the user-terminal content managing unit 126 determined whether the already-decrypted content is manage also after that without deleting the already-decrypted content after referring to it. Moreover, when it is determined that the already-decrypted content is not managed, the user-terminal content managing unit 126 discards the already-decrypted content and transmits discard information indicating the effect that the already-decrypted content is discarded to the management apparatus 200. For further details, when an instruction of the effect that the already-decrypted content is further managed by the user terminal 100 is input by the user, the user-terminal content managing unit 126 determines that the already-decrypted content is further managed by the user terminal 100. When an instruction of the effect that the already-decrypted content is not hereafter managed is input by the user, the user-terminal content managing unit 126 determines that the already-decrypted content is not managed and discards the content.

The decrypting unit 127 decrypts an encrypted content to be referred to by using the decryption key received from the management apparatus 200. For example, the decrypting unit 127 decrypts an encrypted content corresponding to the archive management ID "0011" by using the key A acquired from the decryption control unit 223 of the management apparatus 200.

Management-Apparatus Reference Managing Unit

The management-apparatus reference managing unit 220 has a memory that stores an authentication control program, a program that defines various types of processing procedures, and required data and executes various processes by using these. As units closely relevant to the present invention, the management-apparatus reference managing unit 220 includes an acquiring unit 221, the authenticating unit 222, the decryption control unit 223, the content management book storage unit 224, the authentication result storage unit 225, and the management-apparatus content managing unit 226.

In this case, the acquiring unit 221 corresponds to an "acquisition step" described in Claims, the authenticating unit 222 corresponds to a "hash value authentication step" and a "failure result authentication step" described in Claims, the decryption control unit 223 corresponds to a "decryption control step" described in Claims, the content management book storage unit 224 corresponds to a "management book memory step" described in Claims, and the authentication result storage unit 225 corresponds to an "authentication result memory step" described in Claims.

The acquiring unit 221 acquires the first hash value and the archive management ID from the user terminal 100 (the authentication inquiring unit 122). For example, the acquiring unit 221 acquires the access user and the archive management ID from the authentication inquiring unit 122 in the case of the user authentication process and acquires the archive management ID and the first hash value from the authentication inquiring unit 122 in the case of the encrypted content authentication process. In addition, the first hash value and the archive management ID acquired by the acquiring unit 221 are utilized by the user authentication process, the encrypted content authentication process, and the access user authentication process that are performed by the authenticating unit 222 to be described below.

The authenticating unit 222 performs the user authentication process, the encrypted content authentication process, the access user authentication process, and the restriction information confirmation process. For example, when receiving the access user from the authentication inquiring unit 122 in the case of the user authentication process, the authenticating unit 222 authenticates whether the received access user is a user that can access the management apparatus 200 and transmits the authentication result to the user terminal 100. For further details, the authenticating unit 222 transmits an authentication success when the received access user is a user that can access the management apparatus 200 and transmits an authentication failure when the received access user is a user that cannot access the management apparatus 200.

Moreover, in the case of the encrypted content authentication process, the authenticating unit 222 reads out the corresponding second hash value from the management information memory unit 211 by using the archive management ID acquired by the acquiring unit 221 as a retrieval key and authenticates whether the first hash value acquired by the acquiring unit 221 and the second hash value are identical to each other.

For example, when the encrypted content authentication process and the access user authentication process are performed together, the authenticating unit 222 determines that the authentication is a success when the second hash value stored in the management information memory unit 211 is identical to the received first hash value in association with the received archive management ID and the access user stored in the management information memory unit 211 is identical to the received access user in association with the received archive management ID. On the other hand, when the hash values and the access users are not identical to each other, the authenticating unit 222 determines that the authentication is a failure.

Moreover, in the case of the restriction information confirmation process, the authenticating unit 222 authenticates whether there is the corresponding authentication failure result or memory medium anomaly information by using the management information acquired by the acquiring unit 221 from the authentication result memory unit 213 as a retrieval key. For example, the authenticating unit 222 confirms whether the authentication failure result or memory medium anomaly information is stored in the authentication result memory unit 213. As further detailed example, the authenticating unit 222 retrieves the authentication result memory unit 213 by using the acquired archive management ID as a retrieval key and confirms whether the authentication failure result or memory medium anomaly information is stored in the authentication result memory unit 213 in associated with the archive management ID. In the case of the explanation using the example of FIG. 11, the authenticating unit 222 authenticates that the authentication failure result or memory medium anomaly information is not stored in the authentication result memory unit 213 when using the archive management ID "0011" as a retrieval key and authenticates that the authentication failure result is stored in the authentication result memory unit 213 when using the archive management ID "0012" as a retrieval key.

In the first embodiment, it has been explained about the case where the authenticating unit 222 authenticates the presence or absence of an authentication failure result and the presence or absence of memory medium anomaly information (the case of performing the restriction information confirmation process) in addition to whether the first hash value and the second hash value are identical to each other (in addition to the encrypted content authentication process). However, the present invention is not limited to this. The authenticating unit 222 may perform only the authentication related to whether the first hash value and the second hash value are identical to each other, or may perform only the authentication related to whether the first hash value and the second hash value are identical to each other and the authentication related to the presence or absence of an authentication failure result.

In other words, the encrypted content authentication process may be performed together with an arbitrary one or a plurality of processes among "the user authentication process", "the access user authentication process", "the restriction information confirmation process", "the authentication failure process", and "the decryption process".

The decryption control unit 223 permits a decryption process when the authentication result performed by the authenticating unit 222 is an authentication success indicating that the first hash value and the second hash value are identical to each other (the encrypted content authentication is a success). For example, the decryption control unit 223 permits a decryption process when the authentication result performed by the authenticating unit 222 is an authentication success (for example, the encrypted content authentication success, the user authentication success, and the access user authentication success) and when it is determined that there is not the authentication failure result and memory medium anomaly information (it is confirmed that there is not restriction information in the restriction information confirmation process).

In the first embodiment, it has been explained about the case where the decryption control unit 223 performs a decryption control by using the presence or absence of the authentication failure result and the presence or absence of the memory medium anomaly information in addition to the authentication result. However, the present invention is not limited to this. The decryption control unit 223 may perform a decryption control by using only the authentication result, or may perform a decryption control by using only the authentication result and the presence or absence of the authentication failure result.

Moreover, the decryption control unit 223 informs the user terminal 100 of the content of restriction. For example, when the authenticating unit 222 determines that the authentication is a failure, the decryption control unit 223 transmits the effect that the authentication result is a failure to the user terminal 100. For example, the decryption control unit 223 informs the user terminal 100 of the effect that the archive management ID "0012" cannot be referred to.

Moreover, the decryption control unit 223 determines whether an encrypted content is managed in the management apparatus 200 as a reference method of the encrypted content. Specifically, the decryption control unit 223 determines whether an encrypted content is decrypted and managed in the management apparatus 200, or whether the encrypted content is decrypted and managed in the user terminal 100. For further details, when an instruction of the effect that an encrypted content is referred to by the management apparatus 200 is input by a user, the decryption control unit 223 determines that the encrypted content is managed in the management apparatus 200. On the other hand, when an instruction of the effect that an encrypted content is referred to by the user terminal 100 is input by a user, the decryption control unit 223 determines that the encrypted content is managed in the user terminal 100.

Moreover, for example, the decryption control unit 223 acquires a decryption key corresponding to the encrypted content to be referred to from the management information memory unit 211 and transmits the decryption key to the user terminal 100. For example, in the case of the explanation using the example of FIG. 9, when the authenticating unit 222 determines that the authentication is a success and a user inputs an instruction of the effect that the content is referred to by the user terminal 100, the decryption control unit 223 acquires the decryption key "key A" that is associated with the archive management ID "0011" and transmits the key A to the user terminal 100.

In addition, it has been explained about the case where the decryption control unit 223 receives an instruction from a user in determining whether the above-described content is managed in the management apparatus 200. However, the present invention is not limited to this. The decryption control unit may determine whether the content is managed in the management apparatus 200 on the basis of the matter that is previously set without receiving an instruction from a user. For example, the system of the present invention stores each content in association with a place (for example, management apparatus, specific user terminal (or memory unit), or the like) to be referred to as a table and the decryption control unit may refer to a content by using the table.

When the decryption control unit 223 permits a decryption process and the user terminal 100 decrypts an encrypted content by using a decryption key, the content management book storage unit 224 acquires storage medium identification information of uniquely identifying the user terminal memory medium into which the decrypted content is written by the user terminal 100 from the user terminal 100 and stores the storage medium identification information in the content management book memory unit 212. When the user terminal 100 discards the content, the content management book storage unit 224 acquires information of the effect that the content is discarded from the user terminal 100 and stores the information in the content management book memory unit 212.

For example, in the case of the explanation using the example of FIG. 10, the content management book storage unit 224 stores the storage medium identification information "B111" acquired from the user terminal 100 (storage destination informing unit) in the content management book memory unit 212 in association with the archive management ID "0011". Moreover, when receiving the effect that the decrypted content is discarded, the content management book storage unit 224 stores the discard information acquired from the user terminal 100 (storage destination informing unit) in the content management book memory unit 212 in association with the corresponding archive management ID. For example, the content management book storage unit 224 stores discard information "already-discarded" in association with the archive management ID "0011".

When the authentication result of encrypted content authentication performed by the authenticating unit 222 is the authentication failure result indicating that the first hash value and the second hash value are not identical to each other, the authentication result storage unit 225 stores the authentication failure result in the authentication result memory unit 213 in association with the archive management ID. For example, as illustrated in FIG. 11, the authentication result storage unit 225 stores the "presence" of authentication failure result in the authentication result memory unit 213 in association with the archive management ID "0012".

Moreover, when the authentication result of encrypted content authentication performed by the authenticating unit 222 is an authentication failure result, the authentication result storage unit 225 acquires the corresponding one memory medium identification information from the management information memory unit 211 by using the archive management ID acquired by the acquiring unit 221 as a retrieval key, acquires the corresponding plurality of management information by using the acquired one memory medium identification information as a retrieval key, and further stores the memory medium anomaly information in the authentication result memory unit 213 in association with the acquired archive management ID.

For example, the authentication result storage unit 225 acquires the identification information of the encrypted content memory medium 300 in which an encrypted content associated with the received archive management ID is stored. In other words, for example, in the case of the explanation using the example illustrated in FIG. 9, the authentication result storage unit 225 acquires the identification information "A2222" of the memory medium in which an encrypted content associated with the archive management ID "0012" is stored. Next, the authentication result storage unit 225 acquires an archive management ID associated with the acquired memory medium identification information.

For example, in the case of the explanation using the example illustrated in FIG. 9, the authentication result storage unit 225 acquires the archive management IDs "0013" and "0014" that are associated with the memory medium identification information "A2222". After that, the authentication result storage unit 225 stores the memory medium anomaly information in association with the acquired archive management ID. In other words, for example, in the case of the explanation using the example of FIG. 11, the authentication result storage unit 225 stores the "presence" of memory medium anomaly information in the authentication result memory unit 213 in association with "0013" and "0014" that are the acquired archive management IDs.

The management-apparatus content managing unit 226 decrypts the encrypted content to be referred to by the management apparatus 200. For example, the management-apparatus content managing unit 226 writes the received encrypted content into the archive storage device memory unit 214. Then, the management-apparatus content managing unit 226 acquires a decryption key corresponding to the uploaded encrypted content from the management information memory unit 211 and decrypts the uploaded encrypted content. In other words, for example, in the case of the explanation using the example illustrated in FIG. 9, the management-apparatus content managing unit 226 acquires the decryption key "key A" associated with the archive management ID "0011" and decrypts the uploaded encrypted content by using the key A.

Effect by First Embodiment

As described above, according to the first embodiment, because the user terminal 100 reads out the encrypted content that is an authentication target from the encrypted content memory medium 300 and computes the first hash value and the management apparatus 200 acquires the first hash value and the archive management ID from the user terminal 100, reads out the corresponding second hash value from the management information memory unit 211 by using the acquired archive management ID as a retrieval key, authenticates whether the first hash value and the second hash value are identical to each other, and permits a decryption process when the authentication result is a success, the security of the archive system can be improved.

For example, in a technique for transmitting only a management ID to the management apparatus 200 and acquiring a decryption key by the user terminal 100 (an example of a process using a decryption key) or a technique for computing a hash value from a content name, transmitting the hash value to the management apparatus 200, and acquiring a decryption key by the user terminal 100, because an archive management ID or a content name leaks, a decryption key is easily leaked. On the other hand, by applying the present invention, because a hash value required for authentication cannot be computed and transmitted unless an encrypted content is kept, the simple leakage of a decryption key can be prevented and the security of the archive system can be improved.

Moreover, in the case of the authentication process, because an encrypted content is not transmitted to the management apparatus 200 and a hash value computed from the encrypted content is transmitted, the leakage of the encrypted content can be prevented and the security of the archive system can be improved.

Moreover, for example, by applying the present invention, when a memory medium that stores an encrypted content degrades and the matter of the encrypted content has an error, the management apparatus 200 authenticates that a hash value computed from the encrypted content has a difference compared with another hash value. As a result, the management apparatus 200 can grasp that the encrypted content has a problem and thus the security of the archive system can be improved.

Moreover, for example, by applying the present invention, when interpolation is performed by a third party on an encrypted content, the management apparatus 200 authenticates that a hash value computed from the encrypted content has a difference compared with another hash value. As a result, the management apparatus 200 can grasp that the encrypted content has a problem and thus the security of the archive system can be improved.

Moreover, according to the first embodiment, because the management apparatus 200 acquires storage medium identification information of uniquely identifying a user terminal memory medium into which the decrypted content is written by the user terminal 100 from the user terminal 100 and stores the storage medium identification information in the content management book memory unit 212 when the decryption control unit 223 permits a decryption process and then the user terminal 100 decrypts an encrypted content by using a decryption key and the management apparatus 200 acquires information of the effect that a content is discarded from the user terminal 100 and stores the information in the content management book memory unit 212 when the user terminal 100 discards the content, the management apparatus 200 can manage which memory medium the decrypted content is written into.

Moreover, according to the first embodiment, because the management apparatus 200 includes the authentication result memory unit 213 that stores an authentication failure result in association with the archive management ID and authenticates whether there is the corresponding authentication failure result by using management information acquired from the authentication result memory unit 213 as a retrieval key when the authentication result is a failure indicating that the first hash value and the second hash value are not identical to each other and the management apparatus 200 permits a decryption process when the authentication result is a success and is a result indicating that there is not an authentication failure result, the decryption process can be restricted for the encrypted content failing in authentication.

For example, when authentication is a failure because a memory medium that stores an encrypted content degrades and the matter of the encrypted content has an error, the management apparatus 200 can restrict access to the encrypted content.

Moreover, for example, when authentication is a failure because interpolation is performed by a third party on an encrypted content, the management apparatus 200 can restrict access to the encrypted content.

Moreover, according to the first embodiment, the encrypted content memory medium 300 stores a plurality of encrypted contents, and the management apparatus 200 further stores memory medium identification information of uniquely identifying the encrypted content memory medium 300 that stores an encrypted content specified by management information in the management information memory unit 211 in association with the management information, acquires the corresponding one memory medium identification information from the management information memory unit 211 by using the acquired archive management ID as a retrieval key when an authentication result is an authentication failure, acquires the corresponding plurality of archive management IDs by using the acquired one memory medium identification information as a retrieval key, further stores memory medium anomaly information in the authentication result memory unit 213 in association with the acquired archive management ID, then authenticates whether there is the corresponding authentication failure result or memory medium anomaly information by using the acquired archive management ID as a retrieval key from the authentication result memory unit 213, and permits a decryption process when the authentication result is an authentication success and is a result indicating that there are not the authentication failure result and the memory medium anomaly information. Therefore, the management apparatus 200 can restrict access to other encrypted contents that are stored in the encrypted content memory medium 300.

For example, compared with a technique for restricting access to an encrypted content when an authentication failure result is actually obtained, by applying the present invention, for example, when an encrypted content memory medium that stores encrypted contents degrades to decrease reliability and the matter of the encrypted content has an error so as to cause an authentication failure, the management apparatus can restrict access to other encrypted contents that are stored in the encrypted content memory medium even when the encrypted contents are a content that does not yet have an authentication failure result.

[b] Second Embodiment

As the first embodiment, when the authentication failure result of the encrypted content authentication process is obtained, it has been explained about a technique for storing an authentication failure result and memory medium anomaly information in association with an archive management ID. However, the present invention is not limited to this. Furthermore, the archive system may migrate an encrypted content indicated by the archive management ID associated with the memory medium anomaly information or the like. Specifically, when the memory medium anomaly information is stored, in other words, when it is suspected that there is some anomaly and degradation in a memory medium, the archive system may newly store an encrypted content stored in the memory medium in another memory medium.

Therefore, it will be below explained about a technique for performing migration in addition to storing the authentication failure result and memory medium anomaly information. In addition, it is simply explained about a point similar to the archive system according to the embodiment.

In other words, in the archive system according to the second embodiment, the archive storage device memory unit 214 of the management apparatus 200 stores the same encrypted content as the encrypted content stored in the encrypted content memory medium 300 in association with management information. In the case of the explanation using the example illustrated in FIG. 8, the encrypted content memory medium 300 stores an encrypted content in association with an archive management ID. For example, the encrypted content memory medium 300 stores the encrypted content "A" in association with "0011", "B" in association with "0012", and "C" in association with "0013". For this reason, similarly to the encrypted content memory medium 300, the archive storage device memory unit 214 stores the encrypted content "A" in association with "0011", "B" in association with "0012", and "C" in association with "0013".

Under such a configuration, in the archive system according to the second embodiment, in addition to components included in the archive system according to the first embodiment, the management-apparatus reference managing unit 220 of the management apparatus 200 further includes a migrating unit. In this case, the migrating unit corresponds to a "migration step" described in Claims.

The migrating unit acquires the archive management ID corresponding to the authentication failure result or memory medium anomaly information from the authentication result memory unit 213 stored by the authentication result storage unit 225, acquires the corresponding encrypted content from the archive storage device memory unit 214 by using the acquired archive management ID as a retrieval key, and performs migration on the acquired encrypted content.

For example, in the case of the explanation using the examples of FIGS. 9 and 10, the migrating unit acquires the archive management IDs "0012" and "0013" corresponding to the authentication failure result and/or memory medium anomaly information from the authentication result memory unit 213 at a retrieval timing. Then, the migrating unit acquires the encrypted content "B" by using the archive management ID "0012" as a retrieval key and the encrypted content "C" by using the archive management ID "0013" as a retrieval key from the archive storage device memory unit 214.

Then, for example, the migrating unit stores the acquired encrypted contents "B" and "C" in the new (different) encrypted content memory medium 300. For further details, the migrating unit selects, among the encrypted content memory media 300, the encrypted content memory medium 300 that does not store an encrypted content (encrypted content specified by the archive management ID that is associated with the authentication failure result or the memory medium anomaly information) which is associated with the authentication failure result or the memory medium anomaly information and stores the acquired encrypted contents "B" and "C". Alternatively, the migrating unit stores the acquired encrypted contents "B" and "C" in the encrypted content memory medium 300 that is not yet used.

In the second embodiment, it has been explained about the case where the migrating unit performs migration at a retrieval timing. However, the present invention is not limited to this. When the authentication failure result or memory medium anomaly information is stored, the migrating unit may perform migration. For example, the migrating unit may perform migration after Step S407 of FIG. 5.

Effect by Second Embodiment

As described above, according to the second embodiment, the management apparatus 200 stores the same encrypted content as the encrypted content stored in the encrypted content memory medium 300 in the archive storage device memory unit 214 in association with an archive management ID, acquires the archive management ID corresponding to the authentication failure result or memory medium anomaly information from the authentication result memory unit 213 stored by the authentication result storage unit 225, acquires the corresponding encrypted content by using the acquired archive management ID as a retrieval key, and migrates the acquired encrypted content. Therefore, for example, when the reliability of the encrypted content memory medium 300 decreases, the management apparatus 200 can migrate the encrypted content stored in the encrypted content memory medium 300 to keep reliable backup.

[c] Third Embodiment

It has been explained about the examples of the present invention, the present invention may be performed by various different configurations in addition to the first and second embodiments described above.

(1) Arrangement of Contents

For example, in the first embodiment, it has not been particularly mentioned about how the management apparatus 200 stores the uploaded encrypted content in an archive-storage-side memory unit. However, the management apparatus 200 may store the content in access and arrangement manners similar to those of the user terminal 100. Moreover, for example, when an encrypted content originally stored in the management apparatus 200 is stored in the encrypted content memory medium 300 and the encrypted content is discarded from the management apparatus 200, the management apparatus 200 may store the encrypted content in access and arrangement manners similar to the original access and arrangement manners of the management apparatus 200 when the encrypted content is uploaded from the user terminal 100 (from the encrypted content memory medium 300). As a result, the archive system can realize access according to a reference method similar to the previous method with respect to the encrypted content (or the decrypted content). Moreover, the encrypted content (or the decrypted content) can be easily restored from the user terminal 100 to the management apparatus 200 in a state where authenticity (access and arrangement) is retained.

(2) System Configuration

Moreover, among the processes described in the present embodiments, the whole or a part of processes that have been automatically performed can be manually performed. For example, the archive system may personally set a memory medium that performs migration and manually set the range of a value assigned to a hash function when an encrypted content is computed. In addition, processing procedures, control procedures, concrete titles, and information including various types of data and parameters (for example, FIGS. 2 to 10), which are described in the document and the drawings, can be arbitrarily changed except that they are specially mentioned.

Moreover, each component of each device illustrated in the drawings is a functional concept. Therefore, these components are not necessarily constituted physically as illustrated in the drawings. In other words, the specific configuration of dispersion/integration of each device is not limited to the illustrated configuration. Therefore, all or a part of each device can dispersed or integrated functionally or physically in an optional unit in accordance with various types of loads or operating conditions. For example, in FIG. 7, the encrypted content memory medium 300 may be separate from the user terminal 100 and the user-terminal content managing unit 126 provided in the user-terminal reference managing unit 120 may be integrated with the management-apparatus reference managing unit 220.

(3) Program

Figure 12A:
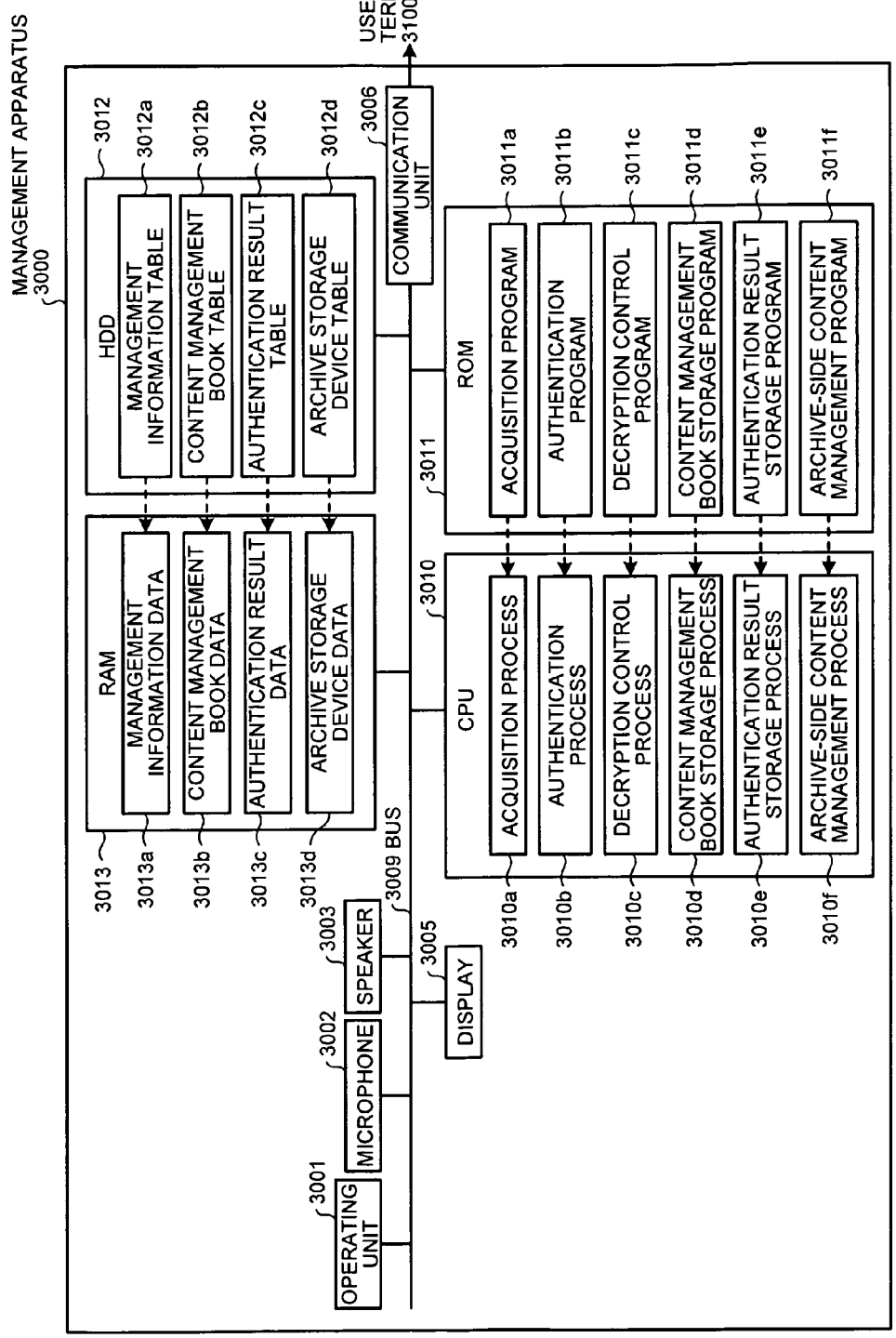

However, in the first embodiment, it has been explained about the case where various types of processes are realized by using hardware logic. However, the present invention is not limited to this. Various types of processes may be realized by executing a previously-prepared program in a computer. Therefore, it will be below explained about an example of a computer that executes an archive system control program having the same function as that of the archive system according to the first embodiment with reference to FIGS. 12A and 12B. FIGS. 12A and 12B are diagrams illustrating a program of the archive system according to the first embodiment.

As illustrated in FIGS. 12A and 12B, a management apparatus 3000 in the third embodiment includes an operating unit 3001, a microphone 3002, a speaker 3003, a display 3005, a communication unit 3006, a CPU 3010, a ROM 3011, an HDD 3012, and a RAM 3013 that are connected to one another via a bus 3009 or the like.

The ROM 3011 previously stores control programs indicating functions similar to the acquiring unit, the authenticating unit, the decryption control unit, the content management book storage unit, the authentication result storage unit, and the management-apparatus content managing unit, which are indicated by the first embodiment. As illustrated in FIGS. 12A and 12B, the control programs are an acquisition program 3011a, an authentication program 3011b, a decryption control program 3011c, a content management book storage program 3011d, an authentication result storage program 3011e, and an archive-side content management program 3011f. It should be noted that these programs 3011a to 3011f may be appropriately integrated or separated similarly to the components of the management apparatus illustrated in FIG. 7.

The CPU 3010 reads out the programs 3011a to 3011f from the ROM 3011 and executes the programs. As a result, as illustrated in FIGS. 12A and 12B, the programs 3011a to 3011f respectively function as an acquisition process 3010a, an authentication process 3010b, a decryption control process 3010c, a content management book storage process 3010d, an authentication result storage process 3010e, and an archive-side content management process 3010f. In this case, the processes 3010a to 3010f respectively correspond to the acquiring unit and the authenticating unit and the decryption control unit and the content management book storage unit and the authentication result storage unit and the management-apparatus content managing unit, which are illustrated in FIG. 7.

The HDD 3012 stores therein a management information table 3012a, a content management book table 3012b, an authentication result table 3012c, and an archive storage device table 3012d. The management information table 3012a corresponds to the management information memory unit. The content management book table 3012b corresponds to the content management book memory unit. The authentication result table 3012c corresponds to the authentication result memory unit. The archive storage device table 3012d corresponds to the archive storage device memory unit.

The CPU 3010 reads out the management information table 3012a, the content management book table 3012b, the authentication result table 3012c, and the archive storage device table 3012d from the HDD 3012, stores the tables in the RAM 3013, and executes an archive storage control program by using management information data 3013a, content management book data 3013b, authentication result data 3013c, and archive storage device data 3013d, which are stored in the RAM 3013. Moreover, as illustrated in FIGS. 12A and 12B, a user terminal 3100 in the third embodiment includes an operating unit 3101, a microphone 3102, a speaker 3103, a display 3105, a communication unit 3106, a CPU 3110, a ROM 3111, an HDD 3112, and a RAM 3113 that are connected to one another via a bus 3109 or the like.

The ROM 3111 previously stores control programs indicating functions similar to the computing unit, the authentication inquiring unit, the restriction information informing unit, the storage destination information informing unit, the encrypted content transmitting unit, the user-terminal content managing unit, and the decrypting unit, which are indicated by the first embodiment. As illustrated in FIGS. 12A and 12B, the control programs are a computing program 3111a, an authentication inquiring program 3111b, a restriction information informing program 3111c, a storage destination information informing program 3111d, an encrypted content transmitting program 3111e, a user-side content managing program 3111f, and a decryption program 3111g. It should be noted that the programs 3111a to 3111g may be appropriately integrated or separated similarly to the components of the user terminal illustrated in FIG. 2.

The CPU 3110 reads out the programs 3111a to 3111g from the ROM 3111 and executes the programs. As illustrated in FIGS. 12A and 12B, the programs 3111a to 3111g respectively function as a computing process 3110a, an authentication inquiring process 3110b, a restriction information informing process 3110c, a storage destination information informing process 3110d, an encrypted content transmitting process 3110e, a user-side content managing process 3110f, and a decryption process 3110g. Moreover, the processes 3110a to 3110g respectively correspond to the computing unit, the authentication inquiring unit, the restriction information informing unit, the storage destination information informing unit, the encrypted content transmitting unit, the user-terminal content managing unit, and the decrypting unit, which are illustrated in FIG. 7.

The HDD 3112 stores therein an encrypted content memory medium table 3112a and a user terminal table 3112b. The encrypted content memory medium table 3112a corresponds to the encrypted content memory medium. The user terminal table 3112b corresponds to the user terminal memory unit.

The CPU 3110 reads out the encrypted content memory medium table 3112a and the user terminal table 3112b from the HDD 3112, stores the tables in the RAM 3113, and executes an archive storage control program by using encrypted content memory medium data 3113a and user terminal data 3113b that are stored in the RAM 3113.

(4) Others.

The archive storage control program described in the present embodiment can be realized by executing a program prepared beforehand with a computer such as a personal computer or a workstation. The program can be distributed via a network such as Internet. Moreover, the program can be recorded in a recording medium, which can be read by the computer, such as a hard disk, a flexible disk (FD), a CD-ROM, an MO, or a DVD and can be executed by being read from the recording medium by the computer.

As described above, according to an aspect of the present invention, it is possible to improve the security of the archive system.

Moreover, according to another aspect of the present invention, the management apparatus can manage which memory medium decrypted contents are written into.

Moreover, according to still another aspect of the present invention, it is possible to restrict a decryption process for encrypted contents that fail in authentication.

Moreover, according to still another aspect of the present invention, when the encrypted content memory medium that stores encrypted contents degrades to decrease reliability and thus errors occur in the encrypted contents to fail in authentication, the management apparatus can restrict access to other encrypted contents that are stored in the encrypted content memory medium.

Moreover, according to still another aspect of the present invention, the management apparatus can keep reliable backup by migrating encrypted contents that are stored in the encrypted content memory medium when the reliability of the encrypted content memory medium decreases.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An archive system, comprising:
   a user terminal that includes a processor that refers to an encrypted content from a removable memory medium; and
   a management apparatus that includes a memory that stores a decryption key for decrypting the encrypted content that is a management target, and a processor that acquires management information uniquely specifying the encrypted content from the user terminal and authenticating whether a process of decrypting the encrypted content specified by the management information by using the decryption key is permitted, wherein
   the processor of the user terminal
      reads out the encrypted content that is an authentication target from the removable memory medium that stores the encrypted content in association with the management information, assigns data forming the read encrypted content to a same hash function as that of the management apparatus, and computes a first hash value, and
   the processor of the management apparatus
      acquires the first hash value and the management information from the user terminal;
      reads out, from the memory that stores a second hash value in association with the management information, the second hash value corresponding to the first hash value by using the acquired management information as a retrieval key, the second hash value being previously computed by assigning data forming the encrypted content retaining its authenticity to the hash function and authenticates whether the first hash value and the second hash value are identical to each other;
      stores, when the authentication result performed is an authentication failure indicating that the first hash value and the second hash value are not identical to each other, an authentication failure result in the memory in association with the management information;
      authenticates whether there is a corresponding authentication failure result by using the management information acquired from the memory as a retrieval key; and
      permits the process of decrypting when an authentication result is an authentication success indicating that the first hash value and the second hash value are identical to each other and when the corresponding authentication failure does not exist in the memory.

2. The archive system according to claim 1, wherein the processor of the management apparatus acquires, from the user terminal, when the processor of the management apparatus permits the process of decrypting and then the processor of the user terminal decrypts the encrypted content by using the decryption key, storage medium identification information of uniquely identifying a user terminal memory medium into which the decrypted content is written by the user terminal to store the storage medium identification information in the memory, and acquires, from the user terminal, when the processor of the user terminal discards the content, information of an effect that the content is discarded to store the information in the memory.

3. The archive system according to claim 1, wherein the removable memory medium stores a plurality of encrypted contents, the processor of the management apparatus causes the memory to store memory medium identification uniquely identifying the removable memory medium that stores the encrypted content specified by the management information in association with the management information, and acquires, when the first hash value and the second hash value are not identical, a corresponding one memory medium identification information from the memory by using the management information as a retrieval key, acquires a corresponding plurality of management information by using the acquired one memory medium identification information as a retrieval key, and stores memory medium anomaly information indicating that the removable memory medium has anomaly in the memory in association with the acquired management information, authenticates whether there is a corresponding authentication failure result or memory medium anomaly information in the memory by using the management information acquired from the user terminal as a retrieval key, and permits the process of decrypting when the first hash value and the second hash value are identical and when the corresponding authentication failure and the memory medium anomaly information do not exist in the memory.

4. The archive system according to claim 3, wherein the management apparatus comprises:

a management apparatus memory that stores a same encrypted content as the encrypted content stored in the removable memory medium in association with the management information, and the processor of the management apparatus acquires management information corresponding to the authentication failure result and/or the memory medium anomaly information from the memory, acquires a corresponding encrypted content by using the acquired management information as a retrieval key, and migrates the acquired encrypted content.

5. A non-transitory computer readable storage medium having stored therein an archive system control program for controlling an archive system that comprises a user terminal that refers to an encrypted content from a removable memory medium and a management apparatus that stores a decryption key for decrypting the encrypted content that is a management target, the management apparatus acquiring management information that is information of uniquely specifying the encrypted content from the user terminal and authenticating whether a process of decrypting the encrypted content specified by the management information by using the decryption key is permitted, the archive system control program causing a computer serving as the user terminal to execute a process comprising:

reading out the encrypted content that is an authentication target from the removable memory medium that stores the encrypted content in association with the management information; and computing a first hash value by assigning data forming the read encrypted content to a same hash function as that of the management apparatus, the archive system control program causing a computer serving as the management apparatus to execute a process comprising:

acquiring the first hash value computed at the computing and the management information from the user terminal;

reading out, from the memory that stores a second hash value in association with the management information, the second hash value corresponding to the first hash value by using the acquired management information as a retrieval key, the second hash value being previously computed by assigning data forming the encrypted content retaining its authenticity to the hash function;

authenticating whether the first hash value acquired at the acquiring and the second hash value are identical to each other;

storing, when the authentication result performed is an authentication failure indicating that the first hash value and the second hash value are not identical to each other, an authentication failure result in the memory in association with the management information;

authenticating whether there is a corresponding authentication failure result by using the management information acquired from the memory as a retrieval key: and permitting the process of decrypting when an authentication result performed at the authenticating is an authentication success indicating that the first hash value and the second hash value are identical to each other and when the corresponding authentication failure does not exist in the memory.

6. The non-transitory computer readable storage medium according to claim 5, wherein the process executed by the computer serving the management apparatus comprises:

acquiring, from the user terminal, when the decryption process is permitted at the permitting and then the user terminal decrypts the encrypted content by using the decryption key, storage medium identification information of uniquely identifying a user terminal memory medium into which the decrypted content is written by the user terminal to store the storage medium identification information;

storing the storage medium identification information in the memory; and storing, in the memory, information of an effect that the content is discarded from the user terminal, when the user terminal discards the content.

7. The non-transitory computer readable storage medium according to claim 5, wherein the removable memory medium stores a plurality of encrypted contents, the computer serving the management apparatus causes the memory to store memory medium identification information of uniquely identifying the removable memory medium that stores the encrypted content specified by the management information in association with the management information, the storing includes
acquiring, when the first hash value and the second hash value are not identical, the corresponding one memory medium identification information from the memory by using the management information acquired at the acquiring the first hash value and the management information as a retrieval key,
acquiring a corresponding plurality of management information by using the acquired one memory medium identification information as a retrieval key, and
storing memory medium anomaly information indicating that the removable memory medium has anomaly in the memory in association with the acquired management information,
the authenticating the authentication failure result includes authenticating whether there is a corresponding authentication failure result or memory medium anomaly information in the memory by using the management information acquired from the user terminal as a retrieval key, and
the permitting includes permitting the process of decrypting when the first hash value and the second hash value are identical and when the corresponding authentication failure and the memory medium anomaly information do not exist in the memory.

8. The non-transitory computer readable storage medium according to claim 7, wherein
the computer serving the management apparatus causes a management apparatus memory to store a same encrypted content as the encrypted content stored in the removable memory medium in association with the management information, and
the process executed by the computer serving the management apparatus comprises
acquiring at least one of management information corresponding to the authentication failure result and the memory medium anomaly information from the memory stored at the storing;
acquiring a corresponding encrypted content by using the acquired management information as a retrieval key; and
migrating the acquired encrypted content.

9. A management apparatus includes a memory that stores a decryption key for decrypting an encrypted content that is a management target, and a processor that acquires management information that is information of uniquely specifying the encrypted content from a user terminal that refers to a content that is encrypted from a removable memory medium, and authenticates whether a process of decrypting the encrypted content specified by the management information by using the decryption key is permitted, the management apparatus comprising:
the processor that acquires a first hash value and the management information from the user terminal;
reads out, from the memory that stores a second hash value in association with the management information, the second hash value corresponding to the first hash value by using the acquired management information as a retrieval key, the second hash value being previously computed by assigning data forming the encrypted content retaining its authenticity to a hash function, and authenticates whether the first hash value and the second hash value are identical to each other;
stores, when the authentication result performed is an authentication failure indicating that the first hash value and the second hash value are not identical to each other, an authentication failure result in the memory in association with the management information;
authenticates whether there is a corresponding authentication failure result by using the management information acquired from the memory as a retrieval key; and
permits the process for decrypting when an authentication result is an authentication success indicating that the first hash value and the second hash value are identical to each other and when the corresponding authentication failure does not exist in the memory.

10. The management apparatus according to claim 9, wherein the processor
acquires, from the user terminal, when the processor permits the process of decrypting and then the user terminal decrypts the encrypted content by using the decryption key, storage medium identification information of uniquely identifying a user terminal memory medium into which the decrypted content is written by the user terminal to store the storage medium identification information in the memory and
acquires, from the user terminal, when the user terminal discards the content, information of an effect that the content is discarded to store the information in the memory.

11. The management apparatus according to claim 9, wherein
the removable memory medium stores a plurality of encrypted contents, and
the processor causes the memory to store memory medium identification information of uniquely identifying the removable memory medium that stores the encrypted content specified by the management information in association with the management information,
acquires, when the first hash value and the second hash value are not identical, the corresponding one memory medium identification information from the memory by using the management information as a retrieval key, acquires a corresponding plurality of management information by using the acquired one memory medium identification information as a retrieval key, and stores memory medium anomaly information indicating that the removable memory medium has anomaly in the memory in association with the acquired management information,
authenticates whether there is a corresponding authentication failure result or memory medium anomaly information in the memory by using the management information acquired from the user terminal from the memory as a retrieval key, and
permits the process of decrypting when the first hash value and the second hash value are identical and when the corresponding authentication failure and the memory medium anomaly information do not exist in the memory.

12. The management apparatus according to claim 11, comprising:
a management apparatus memory that stores a same encrypted content as the encrypted content stored in the removable memory medium in association with the management information; and
the processor acquires management information corresponding to the authentication failure result and/or the memory medium anomaly information from the memory, acquires a corresponding encrypted content by using the acquired management information as a retrieval key, and migrates the acquired encrypted content.

13. A controlling method performed in an archive system that includes a user terminal that refers to an encrypted content from a removable memory medium, and a management apparatus that stores a decryption key for decrypting the encrypted content that is a management target, the management apparatus acquiring management information that is information of uniquely specifying the encrypted content from the user terminal and authenticating whether a process of decrypting the encrypted content specified by the management information by using the decryption key is permitted, the controlling method comprising:

in the user terminal, reading out the encrypted content that is an authentication target from the removable memory medium that stores the encrypted content in association with the management information, computing a first hash value by assigning data forming the read encrypted content to a same hash function as that of the management apparatus, and in the management apparatus, acquiring the first hash value computed at the computing and the management information from the user terminal;

reading out, from the memory that stores a second hash value in association with the management information, the second hash value corresponding to the first hash value by using the acquired management information as a retrieval key, the second hash value being previously computed by assigning data forming the encrypted content retaining its authenticity to the hash function;

authenticating whether the first hash value acquired at the acquiring and the second hash value are identical to each other;

storing, when the authentication result performed is an authentication failure indicating that the first hash value and the second hash value are not identical to each other, an authentication failure result in the memory in association with the management information;

authenticating whether there is a corresponding authentication failure result by using the management information acquired at the acquiring from the memory as a retrieval key; and permitting the process of decrypting when an authentication result performed at the authenticating is an authentication success indicating that the first hash value and the second hash value are identical to each other and when the corresponding authentication failure does not exist in the memory.

14. The controlling method according to claim 13, comprising: in the management apparatus, acquiring, from the user terminal, when the decryption process is permitted at the permitting and then the user terminal decrypts the encrypted content by using the decryption key;

storing, in the memory, storage medium identification information of uniquely identifying a user terminal memory medium into which the decrypted content is written by the user terminal;

acquiring, from the user terminal, when the user terminal discards the content, information of an effect that the content is discarded; and storing the information in the memory.

15. The controlling method according to claim 13, wherein the removable memory medium stores a plurality of encrypted contents, the management apparatus causes the memory to store memory medium identification information of uniquely identifying the removable memory medium that stores the encrypted content specified by the management information in association with the management information, the storing includes acquiring, when the first hash value and the second hash value are not identical, the corresponding one memory medium identification information from the memory by using the management information acquired at the acquiring as a retrieval key; acquiring a corresponding plurality of management information by using the acquired one memory medium identification information as a retrieval key; and storing memory medium anomaly information indicating that the removable memory medium has anomaly in the memory in association with the acquired management information, the authenticating the authentication failure result includes authenticating whether there is a corresponding authentication failure result or memory medium anomaly information in the memory by using the management information acquired from the user terminal as a retrieval key, and the permitting includes permitting the process of decrypting when the first hash value and the second hash value are identical and when the corresponding authentication failure and the memory medium anomaly information do not exist in the memory.

16. The controlling method according to claim 15, wherein the management apparatus causes the memory to store a same encrypted content as the encrypted content stored in the removable memory medium in association with the management information, and the method comprising acquiring management information corresponding to at least one of the authentication failure result and the memory medium anomaly information from the memory stored at the storing;

acquiring a corresponding encrypted content by using the acquired management information as a retrieval key; and migrating the acquired encrypted content.

* * * * *